US011734579B2

(12) United States Patent
Neelamana

(10) Patent No.: US 11,734,579 B2
(45) Date of Patent: *Aug. 22, 2023

(54) SYSTEMS AND METHODS FOR EXTRACTING SPECIFIC DATA FROM DOCUMENTS USING MACHINE LEARNING

(71) Applicant: CONVR INC., Schaumburg, IL (US)

(72) Inventor: Harish Neelamana, Hoffman Estates, IL (US)

(73) Assignee: Convr Inc., Schaumburg, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/688,704

(22) Filed: Mar. 7, 2022

(65) Prior Publication Data

US 2022/0188651 A1 Jun. 16, 2022

Related U.S. Application Data

(63) Continuation of application No. 16/663,552, filed on Oct. 25, 2019, now Pat. No. 11,270,213, which is a (Continued)

(51) Int. Cl.
*G06N 20/00* (2019.01)
*G06N 5/02* (2023.01)
(Continued)

(52) U.S. Cl.
CPC ............. *G06N 5/02* (2013.01); *G06F 16/248* (2019.01); *G06F 16/252* (2019.01); *G06N 5/04* (2013.01); *G06N 20/00* (2019.01); *G06Q 10/10* (2013.01)

(58) Field of Classification Search
CPC . G06N 5/02; G06N 5/04; G06N 20/00; G06F 16/248; G06F 16/252;
(Continued)

(56) References Cited

U.S. PATENT DOCUMENTS 6,970,858 B1   11/2005   Nichols
7,089,222 B1    8/2006   Lannert et al.
(Continued)

FOREIGN PATENT DOCUMENTS

AU    2004254950 A1       1/2005
CA       2703007 A1 *     4/2009   ............ G06F 17/21
(Continued)

OTHER PUBLICATIONS https://www.airslate.com/bot/explore/pre-fill-from-opencv-bot (last accessed Mar. 7, 2022).

*Primary Examiner* — Steven P Sax
(74) *Attorney, Agent, or Firm* — GrowIP Law Group LLC

(57) ABSTRACT

A method includes generating, by one or more processors, a first graphical interface. The first graphical interface includes a card-based view with each card in the card-based view corresponding to a field of analysis from a plurality of fields of analysis. The method also includes transmitting, to a client device, the representation of the first graphical interface; receiving, from the client device, a selection of a particular card of the card-based view; and, based on the received selection, generating a representation of a second graphical interface that includes a detailed view of output data associated with a field of analysis that corresponds to the particular card. The method further includes transmitting, to the client device, the representation of the second graphical interface.

16 Claims, 24 Drawing Sheets

Related U.S. Application Data continuation-in-part of application No. 16/180,562, filed on Nov. 5, 2018, now Pat. No. 11,049,042.

(51) Int. Cl.
*G06N 5/04* (2023.01)
*G06F 16/248* (2019.01)
*G06F 16/25* (2019.01)
*G06Q 10/10* (2023.01)

(58) Field of Classification Search
CPC .. G06F 17/248; G06F 3/0482; G06F 17/2872; G06F 9/44; G06F 8/38; G06F 17/30; G06F 17/27; G06F 17/24; G06F 17/30731; G06F 17/3053; G06F 16/986; G06Q 10/10; G06Q 50/00; G06Q 10/06; G06K 9/00456; G06K 9/00463; H04L 67/42; H04L 29/06
See application file for complete search history.

(56) References Cited

U.S. PATENT DOCUMENTS

| | | | |
|---|---|---|---|
| 7,483,871 B2 | 1/2009 | Herz | |
| 8,442,940 B1 | 5/2013 | Faletti et al. | |
| 9,292,153 B1 | 3/2016 | Edwards et al. | |
| 9,298,780 B1 | 3/2016 | Madhani et al. | |
| 9,483,584 B2 | 11/2016 | Batra | |
| 10,032,225 B1 * | 7/2018 | Fox | G06Q 20/321 |
| 10,062,039 B1 | 8/2018 | Lockett | |
| 10,212,562 B2 | 2/2019 | Clark et al. | |
| 10,380,147 B1 * | 8/2019 | Omland | G06F 16/30 |
| 10,489,441 B1 * | 11/2019 | Joshi | G06F 16/951 |
| 10,922,473 B1 | 2/2021 | Cogan | |
| 11,101,037 B2 * | 8/2021 | Allen | G16H 40/67 |
| 11,158,012 B1 * | 10/2021 | Rajpara | G06Q 50/18 |
| 11,295,013 B2 * | 4/2022 | Copty | G06F 21/577 |
| 11,392,651 B1 * | 7/2022 | McClusky | G06F 40/295 |
| 2005/0055306 A1 | 3/2005 | Miller et al. | |
| 2006/0216683 A1 | 9/2006 | Goradia | |
| 2008/0168135 A1 | 7/2008 | Redlich et al. | |
| 2008/0313532 A1 | 12/2008 | Dames et al. | |
| 2009/0012761 A1 | 1/2009 | Bertrand et al. | |
| 2009/0254572 A1 | 10/2009 | Redlich et al. | |
| 2009/0259975 A1 | 10/2009 | Asai | |
| 2010/0057610 A1 | 3/2010 | Pinkerton | |
| 2010/0306249 A1 | 12/2010 | Hill et al. | |
| 2011/0004588 A1 | 1/2011 | Leitersdorf et al. | |
| 2011/0213655 A1 | 9/2011 | Henkin et al. | |
| 2013/0007587 A1 | 1/2013 | Marantz et al. | |
| 2013/0074063 A1 | 3/2013 | Schwartz et al. | |
| 2013/0268357 A1 | 10/2013 | Heath | |
| 2013/0282430 A1 | 10/2013 | Kannan et al. | |
| 2014/0229204 A1 | 8/2014 | Huynh et al. | |
| 2015/0127659 A1 | 5/2015 | Madhani et al. | |
| 2015/0135300 A1 | 5/2015 | Ford | |
| 2015/0186507 A1 | 7/2015 | Pawar et al. | |
| 2015/0331995 A1 | 11/2015 | Zhao et al. | |
| 2016/0036899 A1 | 2/2016 | Moody et al. | |
| 2016/0147946 A1 | 5/2016 | Reden | |
| 2016/0147954 A1 | 5/2016 | Tari et al. | |
| 2016/0162478 A1 | 6/2016 | Blassin et al. | |
| 2016/0182558 A1 | 6/2016 | Tripp | |
| 2016/0364391 A1 | 12/2016 | Eichenlaub et al. | |
| 2016/0364608 A1 | 12/2016 | Sengupta et al. | |
| 2017/0076221 A1 | 3/2017 | Boinodiris et al. | |
| 2017/0076226 A1 | 3/2017 | Allen et al. | |
| 2017/0124052 A1 | 5/2017 | Campbell et al. | |
| 2017/0140047 A1 | 5/2017 | Bendig et al. | |
| 2017/0161439 A1 | 6/2017 | Raduchel et al. | |
| 2017/0242879 A1 | 8/2017 | Hatami-Hanza | |
| 2017/0315979 A1 | 11/2017 | Boucher et al. | |
| 2018/0025303 A1 | 1/2018 | Janz | |
| 2018/0046609 A1 | 2/2018 | Agarwal et al. | |
| 2018/0046764 A1 * | 2/2018 | Katwala | G16H 15/00 |
| 2018/0285248 A1 | 10/2018 | Gupta | |
| 2019/0065970 A1 | 2/2019 | Bonutti et al. | |
| 2019/0108419 A1 | 4/2019 | Coven et al. | |
| 2019/0180641 A1 | 6/2019 | Donaldson et al. | |
| 2019/0190976 A1 | 6/2019 | Chen et al. | |
| 2019/0303448 A1 | 10/2019 | Colangelo | |
| 2020/0042593 A1 | 2/2020 | Hewitt et al. | |
| 2020/0042642 A1 | 2/2020 | Bakis et al. | |
| 2020/0074175 A1 | 3/2020 | Zheng et al. | |
| 2020/0098018 A1 | 3/2020 | Narula | |
| 2020/0104359 A1 | 4/2020 | Patel et al. | |
| 2020/0133629 A1 * | 4/2020 | Pratt | G06F 9/453 |
| 2021/0287297 A1 * | 9/2021 | Hayward | G10L 15/26 |
| 2021/0374861 A1 * | 12/2021 | McClelland | H04L 9/50 |

FOREIGN PATENT DOCUMENTS

| | | | | |
|---|---|---|---|---|
| CA | 2957327 A1 | 6/2009 | | |
| CA | 2642458 A1 | 5/2010 | | |
| CA | 2933175 A1 | 12/2010 | | |
| CA | 2816107 A1 | 5/2012 | | |
| CA | 2824627 A1 * | 8/2012 | | G06F 16/211 |
| CA | 3035640 A1 * | 4/2018 | | G06F 16/2455 |
| CA | 2810541 C | 2/2019 | | |
| CA | 3072045 A1 | 2/2019 | | |
| CA | 3075865 A1 * | 3/2019 | | G06F 16/3344 |
| CA | 2807494 C * | 2/2020 | | G06F 16/252 |
| CA | 2917606 C * | 7/2020 | | G06F 19/00 |
| CN | 109614102 A | 4/2019 | | |
| CN | 109101597 B * | 8/2019 | | G06F 17/2775 |
| CN | 107257983 B | 3/2021 | | |
| SG | 10202000787 P | 3/2020 | | |

\* cited by examiner

DISPLAY 1100

DOCUMENT VIEWER

STRUCTURE OUTPUT VIEWER 1120

| Total Recovery | Accident Date | Claim Status |
|---|---|---|
| $8,717 | 4/20/2001 | CLOSED |
| $18,700 | 6/7/2011 | CLOSED |
| $2,311 | 7/7/2008 | CLOSED |
| $3,221 | 12/30/2017 | OPENED |
| $6,667 | 10/5/2005 | CLOSED |
| $55,133 | 7/17/2009 | CLOSED |

ORIGINAL DOCUMENT VIEWER 1130

Customer Claim

Customer No. 755-1787        Date: 7/17/2009

Client Name:                          Recovery: $55,133
Jane Smith

Address:                                 Status of claim:
1717 Main Road                    Closed
Springfield Comment:
Car frame is completely destroyed. Car is totaled.

Signature
/John P/

FIG. 11

DISPLAY 1210

STRUCTURE OUTPUT VIEWER 1220

| Question | Answer |
|---|---|
| Licensed Contractor? | Yes |
| Acquired Permit? | No |
| Inspected before construction? | Yes |
| Inspected after construction? | No |
| Architectural plan? | Yes |

FIG. 12

DISPLAY 1310

VALUES VIEWER 1320

| Attributes | Document(s) value | D3 Value |
|---|---|---|
| Year Built | 1985 | 1985 |
| Construction Type | Wood | - |
| Number of Stories | 3 | 3 |
| Roof Type | Flat | Flat |
| Roof Age | - | 4 |
| Pool | 1 | 1 |

FIG. 13

SCORE VIEWER 1420

| Company | D3 Score | Description |
|---|---|---|
| ABC Inc | 3/5 | Workers Comp |
| WXY LLC | 5/5 | Car Accident |
| QWE Inc | 1/5 | Flood |
| APP LLP | 1/5 | Workers Comp |
| VCR LLC | 2/5 | Hurricane |

DISPLAY 1410

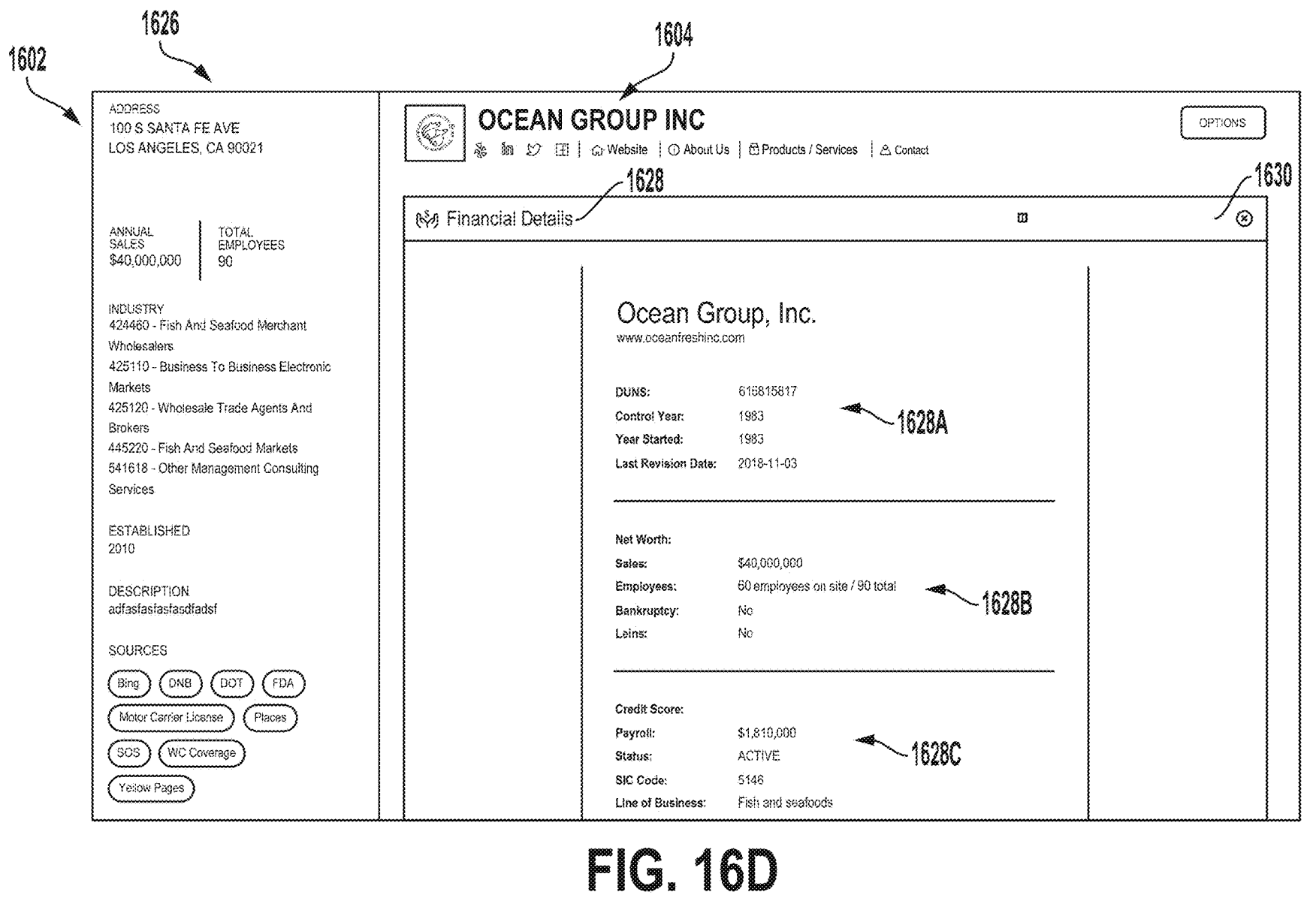

ADDRESS
100 S SANTA FE AVE
LOS ANGELES, CA 90021

| ANNUAL SALES | TOTAL EMPLOYEES |
|---|---|
| $40,000,000 | 90 |

INDUSTRY
424460 - Fish And Seafood Merchant Wholesalers
425110 - Business To Business Electronic Markets
425120 - Wholesale Trade Agents And Brokers
445220 - Fish And Seafood Markets
541618 - Other Management Consulting Services

ESTABLISHED
2010

DESCRIPTION
adfasfasfasdfadsf

SOURCES
(Bing) (DNB) (DOT) (FDA)
(Motor Carrier License) (Places)
(SOS) (WC Coverage)
(Yellow Pages)

1604 →

OCEAN GROUP INC
❀ 🏢 ↩ ⊞ | ⊕ Website | 🏢 About Us | 🛒 Products / Services | 👤 Contact 1628 → ⓜ Financial Details

1630 → OPTIONS

Ocean Group, Inc.
www.oceanfreshinc.com

| | | |
|---|---|---|
| DUNS: | 615815817 | ← 1628A |
| Control Year: | 1983 | |
| Year Started: | 1983 | |
| Last Revision Date: | 2018-11-03 | |
| | | |
| Net Worth: | $40,000,000 | |
| Sales: | $40,000,000 | |
| Employees: | 60 employees on site / 90 total | ← 1628B |
| Bankruptcy: | No | |
| Leins: | No | |
| | | |
| Credit Score: | | |
| Payroll: | $1,810,000 | ← 1628C |
| Status: | ACTIVE | |
| SIC Code: | 5146 | |
| Line of Business: | Fish and seafoods | |

FIG. 16D

SYSTEMS AND METHODS FOR EXTRACTING SPECIFIC DATA FROM DOCUMENTS USING MACHINE LEARNING

CROSS-REFERENCE TO RELATED APPLICATIONS

This patent application is a continuation of U.S. patent application Ser. No. 16/663,552, filed Oct. 25, 2019, which is a continuation-in-part of U.S. patent application Ser. No. 16/180,562, filed Nov. 5, 2018, now patented as U.S. Pat. No. 11,049,042, the disclosures of each of which are incorporated by reference herein in their entireties.

BACKGROUND

Reading and extracting structured data from non-standardized documents can be a difficult task. For example, reading through documents used for underwriting business insurance can involve reading a wide variety of documents, including documents related to loss history, credit score, employment history, salary verification, financial statements, building permits, statements of values, insurance application forms, and health inspection documents, among many others. Insurance underwriting entails reviewing these and multiple other documents to determine the risk that a specific liability entails.

Some automated techniques for reading and extracting data from documents exist. However, the available automated techniques for extracting textual data are not designed to analyze and extract specific fields related to the business process. For example, there are terms and concepts that are unique to insurance. Some of these terms or concepts may have different applications or meanings in a non-insurance domain. As a result, the existing automated techniques may not successfully extract insurance-specific data, and/or may incorrectly apply the same information in an insurance domain.

Some current automated techniques for extracting data use supervised machine learning techniques. Supervised machine learning techniques involve humans actively creating seed datasets related to the data to be extracted and monitoring the machine's methods and accuracy. However, actively creating seed datasets involves continuous maintenance and human effort to develop new seed datasets to re-train the machine. This human effort can be expensive, error-prone, and time-consuming and further may result in biased machine learning algorithms.

SUMMARY

In one aspect, a system is provided. A system has a memory device that stores at least a set of computer executable instructions for a machine learning algorithm and a pre-fill engine. A processor causes the pre-fill engine to perform functions including receiving electronic documents, seed dataset documents, and pre-fill questions, where the seed dataset documents comprise a set of documents providing reference for determining output documents by the pre-fill engine, and where the pre-fill questions comprise a set of pre-fill questions to be answered using the pre-fill engine. The functions also include determining output data from the electronic documents and data references that enable navigation through the electronic documents using a machine learning algorithm, where the output data comprise data relevant to a particular field of analysis, and where the data references rely upon terminology, categories, classifications and ontology of the particular field of analysis. Additionally, the functions include determining output questions from the set of pre-fill questions and the data references that enable navigation through the electronic documents using the machine learning algorithm, where the output questions are relevant to the particular field of analysis. The functions further include determining output documents from the seed dataset documents and the data references to enable navigation through the electronic documents using the machine learning algorithm, where the output documents are relevant to the particular field of analysis according to the data references. In addition, the functions include presenting one or more answers for one or more of the output questions using a graphical user interface.

In a second aspect, the disclosure describes a method comprising receiving electronic documents, seed dataset documents, and pre-fill questions, where the electronic documents comprise a set of documents to be processed by a pre-fill engine of a computing device, where the seed dataset documents comprise a set of documents providing reference for determining output documents by the pre-fill engine, and where the pre-fill questions comprise a set of pre-fill questions to be answered using the pre-fill engine. The method also includes determining output data from the electronic documents and data references to enable navigation through the electronic documents using a machine learning algorithm executed by the computing device, where the output data comprise data relevant to a particular field of analysis, and where the data references rely upon terminology, categories, classifications and ontology of the particular field of analysis. In addition, the method includes determining output questions from the set of pre-fill questions and the data references to enable navigation through the electronic documents using the machine learning algorithm, where the output questions are relevant to the particular field of analysis. Furthermore, the method includes determining output documents from the seed dataset documents and the data references to enable navigation through the electronic documents using the machine learning algorithm, where the output documents are relevant to the particular field of analysis based on the data references. Additionally, the method includes presenting one or more answers for one or more of the output questions using a graphical user interface.

In a third aspect, the disclosure describes a non-transitory computer readable medium storing a set of instructions that, when executed by one or more processors of a computing device, cause the computing device to perform functions. The functions include receiving electronic documents, seed dataset documents, and pre-fill questions, where the electronic documents are a set of documents to be processed by a pre-fill engine of the computing device, where the seed dataset documents comprise a set of documents providing reference for the pre-fill engine, and where the pre-fill questions comprise a set of questions to be answered using the pre-fill engine. Additionally, the functions includes determining output data from the electronic documents and data references to enable navigation through the electronic documents using a machine learning algorithm executed by the computing device, where the output data comprise data relevant to a particular field of analysis, and where the data references rely upon terminology, categories, classifications and ontology of the particular field of analysis. In addition, the functions further include determining output questions from the set of pre-fill questions and data references to enable navigation through the electronic documents using the machine learning algorithm, where the output questions are relevant to the particular field of analysis. Furthermore, the functions includes determining output documents from the seed dataset documents and data references to enable navigation through the electronic documents using the machine learning algorithm, where the output documents are relevant to the particular field of analysis. The functions further include presenting one or more answers for one or more of the output questions using a graphical user interface.

In a fourth aspect, a method is provided. The method includes generating, by one or more processors, a representation of a first graphical interface, where the representation of a first graphical interface is based on data from a database, the database containing (i) output data from electronic documents and (ii) data references that categorize the output data from the electronic documents into a plurality of fields of analysis, where the first graphical interface includes a card-based view, and where each card in the card-based view corresponds to a field of analysis from the plurality of fields of analysis. The method also includes transmitting, by the one or more processors and to a client device, the representation of the first graphical interface. The method also includes receiving, at the one or more processors and from the client device, a selection of a particular card of the card-based view. The method also includes, based on the received selection, generating, at the one or more processors, a representation of a second graphical interface, wherein the second graphical interface includes a detailed view of output data associated with a field of analysis that corresponds to the particular card. The method also includes transmitting, by the one or more processors and to the client device, the representation of the second graphical interface.

In a fifth aspect, an article of manufacture is provided. The article of manufacture may include a non-transitory computer-readable medium, having stored thereon program instructions that, upon execution by a computing system, cause the computing system to perform operations in accordance with the fourth aspect.

In a sixth aspect, a computing system is provided and may include at least one processor, as well as memory and program instructions. The program instructions may be stored in the memory, and upon execution by the at least one processor, cause the computing system to perform operations in accordance with the fourth aspect.

In a seventh aspect, a system is provided and may include various means for carrying out each of the operations of the fourth aspect.

BRIEF DESCRIPTION OF THE FIGURES

The above, as well as additional, features will be better understood through the following illustrative and non-limiting detailed description of example embodiments, with reference to the appended drawings.

FIGS. 11, 12, 13, and 14 show displays of a user interface related to a client subsystem, according to an example embodiment.

FIGS. 15A, 15B, 16A, 16B, 16C, 16D, 16E, and 16F depict example graphical interfaces, according to example embodiments.

DETAILED DESCRIPTION

Figure 1:
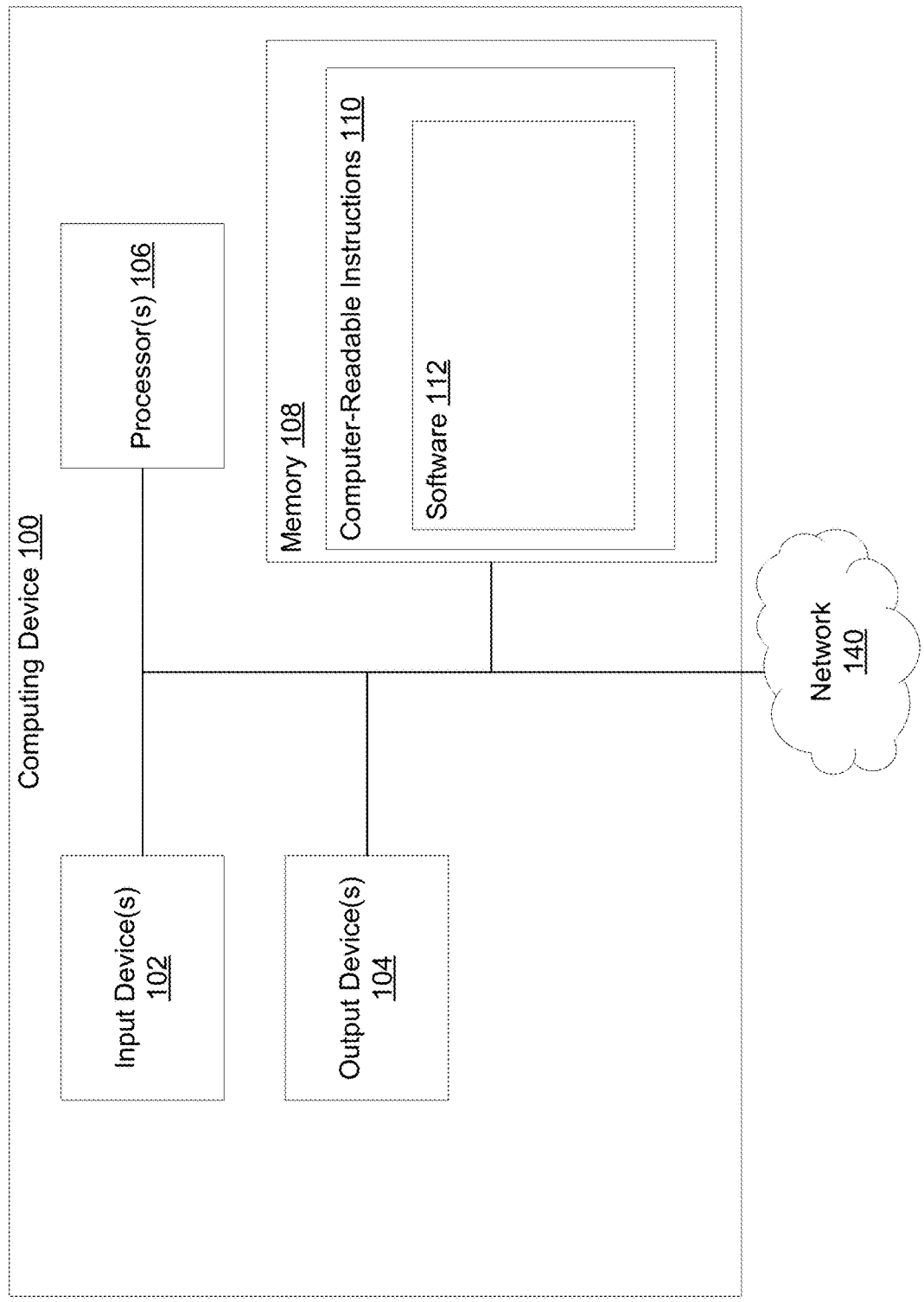
FIG. 1 is a schematic block diagram illustrating a computing device, according to an example embodiment.

Example embodiments will now be described more fully hereinafter with reference to the accompanying drawings. That which is encompassed by the claims may, however, be embodied in many different forms and should not be construed as limited to the embodiments set forth herein; rather, these embodiments are provided by way of example. Furthermore, like numbers refer to the same or similar elements or components throughout.

I. Overview

Herein are described techniques that relate to systems and methods for extracting data from formatted and non-formatted documents using machine learning algorithms to answer relevant questions. A machine learning algorithm is an algorithm that is able to use data to progressively improve performance of one or more tasks without being explicitly programmed to perform the task(s). For example, a machine learning algorithm can be used to extract information from documents. Some machine learning algorithms that extract information from documents can handle non-formatted documents as input and extract sought-after information as output, with little re-training.

The machine learning algorithms can operate on domain-specific documents of various formats. Domain-specific documents related to insurance can include, for example, insurance-related documents related to evaluating an insurance application of an individual or company. The insurance-related documents can come in various different formats, including some insurance-related documents that have no specific format. Extracting information from the insurance-related documents can involve determining questions that clarify and/or augment the extracted information, where the questions can be based on an understanding of how the insurance-related information will be applied. Extracting insurance-related information can provide a greater challenge based on a number of documents—extracting insurance-related information from tens of documents is relatively easy compared to extracting insurance-related information from hundreds, thousands, or even more documents.

The systems and methods described herein can efficiently and accurately read electronic documents included in a corpus of electronic documents, categorize the documents, and classify the data in accordance with, for example, the ontology of a domain. An ontology of a domain is a set of concepts and categories that shows their properties and the relations between them for the domain. A domain can be a specific activity or body of knowledge, for example, psychology, insurance, academia, athletics, finance, and/or another category. The ontology of a domain therefore can include a general category of definitions that can be used to group documents and data for the domain. The corpus of electronic documents can vary in size (e.g., from one to millions) and can include various document types and formats. The corpus can include, for example, insurance and non-insurance specific documents with differing content.

The systems and methods described herein can use a seed dataset (a set of example data) of domain relevant documents, a domain semantics dictionary, and a domain ontology to identify domain-specific documents and extract relevant data through machine learning algorithms. As described herein, machine learning algorithms can be applied to extract and classify relevant domain-specific information from electronic documents, especially in cases where manual techniques would be impractical; e.g., due to a large number of electronic documents, a large amount of data within some or all of the electronic documents, in cases where the electronic documents have varying formats, types, and/or content, in scenarios where time for processing of the electronic documents too short for manual techniques. In some embodiments, the systems and methods described herein can use a list of questions and a set of data to determine additional relevant questions to for extracting further, relevant data and to determine answers for the relevant questions. For example, if the system is performing a vehicle insurance analysis, it would not answer all available insurance-related questions, but only answer questions that are relevant to vehicle insurance. The system can go further and answer relevant questions for specific types of vehicle insurance, for example, vehicle insurance for convertible cars, for motorcycles, or for trucks.

Additional seed datasets may be generated from a corpus of electronic documents. This is done, for example, by training the seed dataset generator with additional words and phrases from the corpus of electronic documents. Additional domain-specific information can be added to domain-specific dictionaries and domain-specific ontologies based on the additional seed datasets. The domain-specific dictionaries and domain-specific ontologies can be systematically updated when, for example, new concepts, words, and/or phrases are uncovered through processing documents. For example, in the domain of insurance, insurance terminology and classifications can be added to update insurance semantics dictionaries and an insurance ontology using one or more seed datasets obtained from a corpus of electronic documents related to insurance. Then, a machine learning algorithm can be trained or re-trained using the additional seed datasets, the updated insurance semantic dictionaries and the updated insurance ontology. After training or re-training, the machine learning algorithm may be used again identify insurance documents, extract, and classify data from a corpus of documents and monitor performance. The herein-described machine-learning algorithm may be re-trained using new seed datasets or updating the insurance semantic dictionaries and insurance ontology until the desired performance is reached. The criteria to reach a desired performance can include a confidence level for the extracted, categorized, and classified data. The criteria can also include user feedback through the graphical user interface. Additionally, the confidence level can relate to a level of an ability of a machine-learning algorithm to accurately recognize a concept and map that concept to an ontology and/or a level of an ability of the machine-learning algorithm accurately translate the ontology to execute business rules For example, performance can be achieved when accuracy of the machine learning algorithm is at least a same level of accuracy as a human reviewer on at least a predetermined percentage (e.g., 75%, 80%, 90%, 95%) of the documents. Once the desired performance is reached with insurance documents identified and the relevant data classified to an insurance ontology, the information may be stored and manipulated for various purposes.

In some embodiments, the corpus of electronic documents can include documents and data related to a submission for an insurance quote from an insurance carrier or agent. Insurance carriers and agents typically process documents to analyze and provide quotes for insurance policies in a short period of time (e.g., as little as a few minutes in some cases). A single insurance carrier or agent may quote hundreds to thousands of policies every month, requiring thousands of documents to be processed each month. The herein-disclosed systems and methods can significantly reduce the time and more accurately extract insurance relevant information than previous electronic systems and methods. Additionally, the systems and methods described herein can classify data according to an insurance ontology and therefore minimize risks due to missing relevant information and/or applying data in an incorrect (non-insurance) context. The systems and methods described herein enable a more accurate analysis and synthesis of the documents included in the corpus for an insurance context.

Reference will now be made in detail to example embodiments, the examples of which are illustrated in the accompanying drawings. In the following description, numerous specific details are set forth in order to provide an understanding of the embodiments. It will be apparent, however, to one of ordinary skill in the art, that the embodiments may be practiced without limitation to these specific details. In some instances, well known methods and/or structures have not been described in detail so as not to unnecessarily obscure the embodiments. Whenever possible, the same reference numbers will be used throughout the drawings to refer to the same or like parts.

II. Example Systems

FIG. 1 is a schematic block diagram illustrating a computing device 100, in accordance with at least some example embodiments. In some embodiments, computing device 100 can be configured to perform the herein-described functions related to extracting data from unformatted documents.

Computing device 100 can include one or more input devices 102, one or more output devices 104, one or more processors 106, one or more and memory 108. It can also include one or more computer-readable instructions 110 and software 112. Computing device 100 can be further connected to network 140.

Input devices 102 can include user input devices, network input devices, sensors, and/or other types of input devices. For example, input devices 102 can include user input devices such as a touch screen, a keyboard, a keypad, a computer mouse, a track ball, a joystick, a camera, a voice recognition module, and/or other similar devices. Network input devices can include wired network receivers and/or transceivers, such as an Ethernet transceiver, a Universal Serial Bus (USB) transceiver, or similar transceiver configurable to communicate via a twisted pair wire, a coaxial cable, a fiber-optic link, or a similar physical connection to a wireline network, such as wired portions of network 140, and/or wireless network receivers and/or transceivers, such as a Bluetooth transceiver, a Zigbee transceiver, a Wi-Fi transceiver, a WiMAX transceiver, a wireless wide-area network (WWAN) transceiver and/or other similar types of wireless transceivers configurable to communicate via a wireless network, such as wireless portions of network 140. Other input devices 102 are possible as well. Network 140 can be a local area network (LAN) or wide area network (WAN) that can include wired and/or wireless connections. Network 140 can allow the computing device 100 to connect to, for example, the internet where the computing device 100 can access third party websites.

Output devices 104 can include user display devices, audio devices, and/or network output devices. Processors 106 can include one or more general purpose processors, central processing units (CPUs), CPU cores, graphical processing units (GPUs), digital signal processors (DSPs) and/or other more special purpose processors.

Memory 108 can include one or more non-transitory machine-readable storage media configured to store data and/or instructions. In particular, memory 108 can store machine-readable instructions 110 that, when executed by processor 106, can cause a computing device to perform functions, such as but not limited to, functions of herein-described devices, networks, methods, features, and scenarios. In particular, machine-readable instructions 110 can include instructions for herein-described pre-fill software 112.

Figure 2:
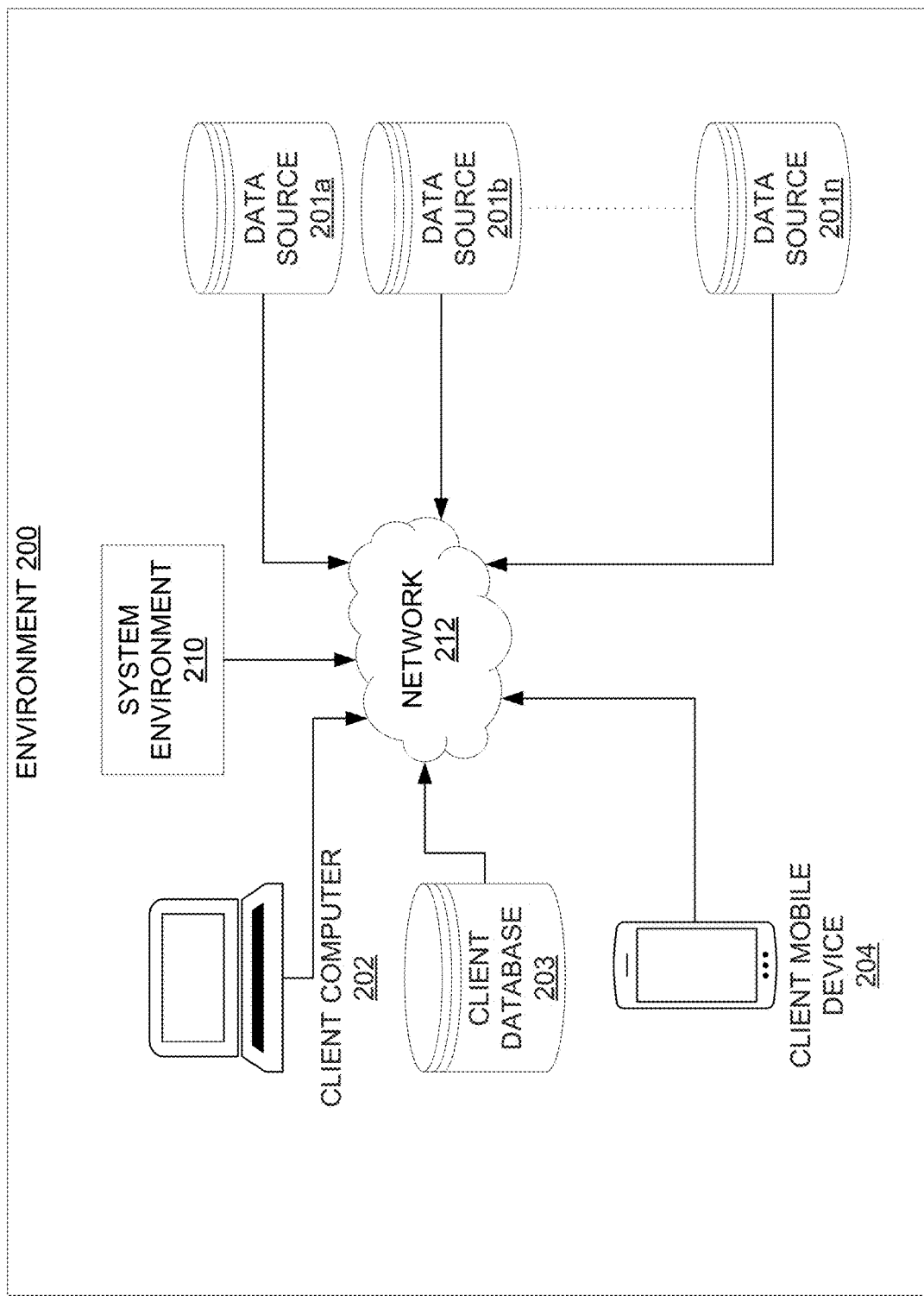
FIG. 2 is a block diagram of an example system for extracting data from domain documents, according to an example embodiment.

FIG. 2 is a block diagram of an example network 200, in accordance with at least some example embodiments. Network 200 includes client computer 202, client database 203, client mobile device 204, system environment 210, data sources 201*a*, 201*b*, . . . 201*n*, and network 212. In some examples, network 212 can have more, fewer, and/or different types of computing devices, servers, data sources, nodes, and/or system environments.

Data sources 201*a*, 201*b*, . . . 201*n* can include data servers from various sources on the internet or within the network 212 which can hold documents, questions, or other data used by the system. Data sources can be accessed by the system through network 212 to extract relevant data from a set of documents. System environment 210 can include the admin subsystem 301 and client subsystem 302 (e.g., as discussed in the context of at least FIG. 3-5). The client computer 202 can be used by the user or, for example, an insurance carrier or broker, to access the system through network 212. The client database 203 can be a database that holds user or client documents and/or other data. Client mobile device 204 can be a device with network capabilities which can be used to access the network 212 and the system environment 210.

Figure 3:
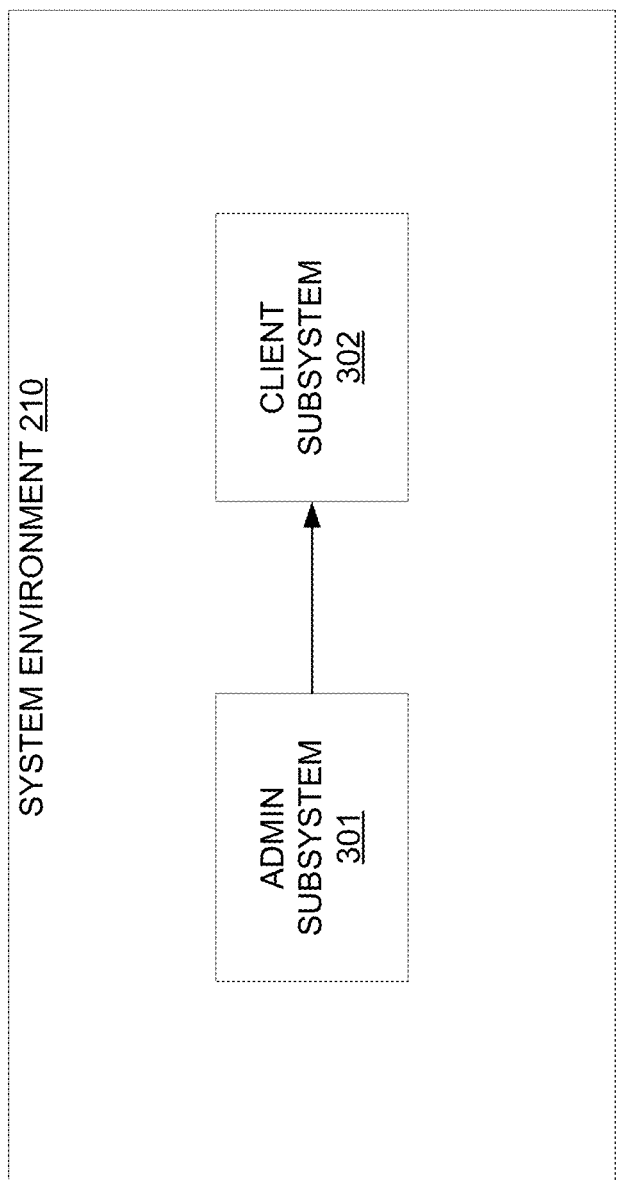
FIG. 3 is a block diagram of an example system environment, according to an example embodiment.

FIG. 3 is a block diagram of an example system environment 210, in accordance with at least some example embodiments. For example, system environment 210 can be an environment for one or more domain-specific systems; e.g., an insurance evaluation system and/or other insurance-specific systems. System environment 210 can include admin subsystem 301 and client subsystem 302. Admin subsystem 301 can be used to manage a database environment for the insurance evaluation system (e.g., as discussed in the context of at least FIG. 4). Client subsystem 302 can enable user interaction with the insurance evaluation system (e.g., as discussed in the context of at least FIG. 5). FIG. 3 illustrates that admin subsystem 301 communicates with client subsystem 302 to perform functionality for the insurance evaluation system.

Figure 4:
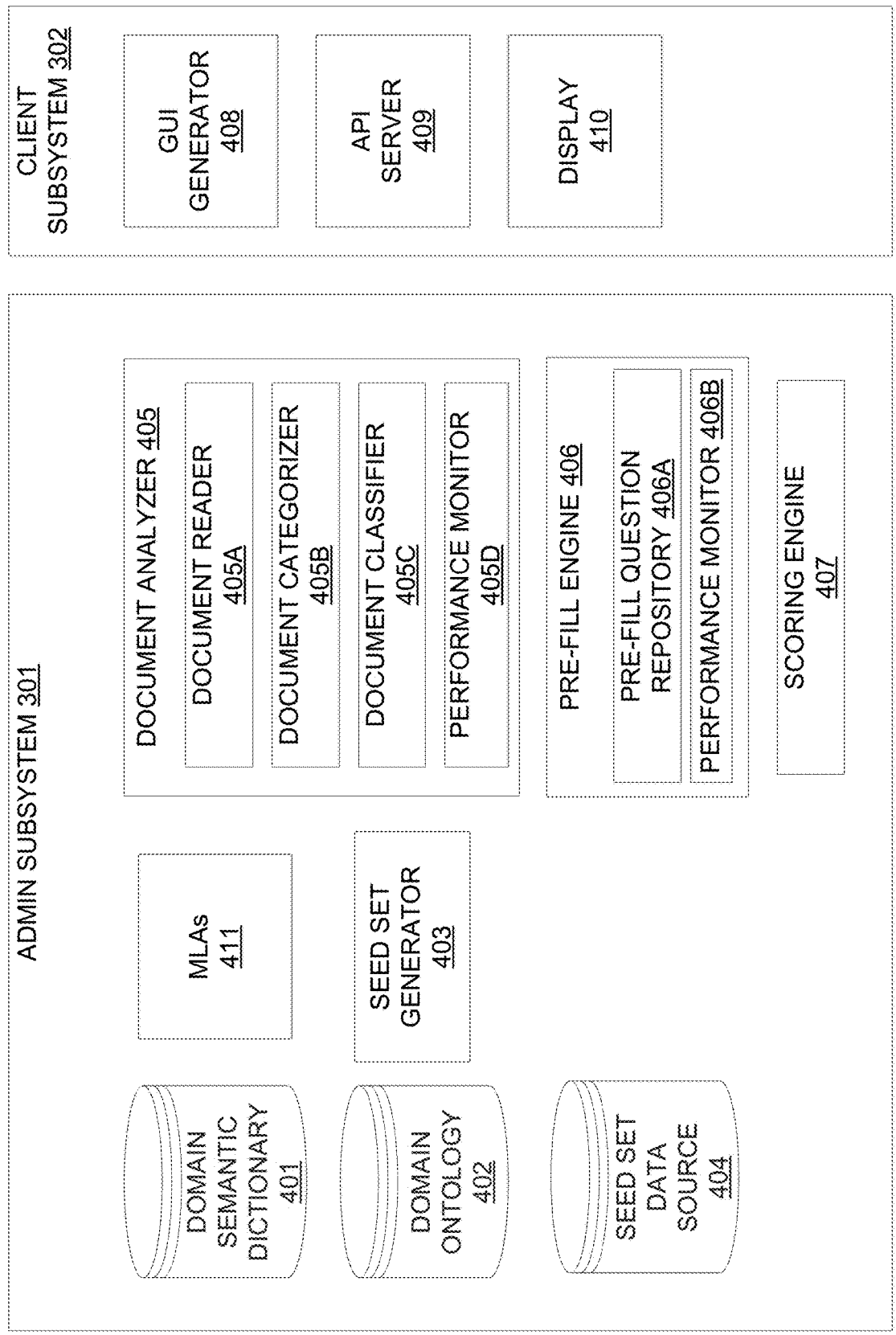
FIG. 4 is a block diagram of example admin and client subsystems, according to an example embodiment.

FIG. 4 is a block diagram of an example admin subsystem 301 and client subsystem 302, in accordance with at least some example embodiments. FIG. 4 does not show all the connections between the components for clarity's sake. The admin subsystem 301 can be used to extract data from documents, determine relevant questions and their answers, and score the overall documents being analyzed for the user to view through the client subsystem 302. Admin subsystem 301 includes domain semantic dictionary 401, domain ontology 402, seed dataset generator 403, seed dataset source 404, document analyzer 405, pre-fill engine 406, scoring engine 407, and one or more machine learning algorithms (MLAs) 411. FIG. 4 shows that document analyzer 405 has document reader 405A, document categorizer 405B, document classifier 405C, and performance monitor 405D. FIG. 4 also shows that pre-fill engine 406 has pre-fill question repository 406A and performance monitor 406B.

Client subsystem 302 can provide a user interface for accessing the admin subsystem 301. The client subsystem 302 includes graphical user interface (GUI) generator 408, application programming interface (API) server 409, and display 410.

The domain semantic dictionary 401 can include a database of domain-specific words. For example, in the domain of insurance, domain semantic dictionary 401 can store insurance-specific words. The domain-specific words in domain semantic dictionary 401 can be used by document analyzer 405 to determine whether one or more words within a document are related to the domain; e.g., in examples where domain semantic dictionary 401 stores insurance-specific words, document analyzer 405 can compare words extracted from a document to the insurance-specific words stored in domain semantic dictionary 401 to determine whether the words extracted from the document are related to insurance. Document analyzer 405 further categorizes and classifies the words extracted from the document (e.g., as discussed in the context of at least FIGS. 5-8).

Domain ontology 402 can include a database of domain-specific categories. For example, in the domain of insurance, domain ontology 402 can store insurance specific categories that can be used by the document categorizer 405B within document analyzer 405 to determine what data are related to insurance within a document and what data would be part of each category. For example, when determining whether to insure a building, categories for building insurance analysis can include roof characteristics and fire protection capabilities. After the document analyzer 405 provides extracted words from the document reader 405A, the roof characteristics and fire protection capabilities categories can be used to extract information related to how much risk insuring the building would entail. Within the roof characteristics category, the age of the building roof and what materials it is made out of can be extracted from the corpus of documents and the roof age and material data can be categorized using the category of roof characteristics. Within the fire protection category, the amount of smoke detectors within the building can be similarly extracted from the corpus of documents and the smoke detector data can be categorized using the category of fire protection capabilities.

A seed dataset generator 403 can generate relevant data that can be used by the pre-fill engine 406, along with the domain output document, to identify relevant questions which are to be answered with the relevant data extracted. The relevant questions can be identified from the set of questions in the pre-fill question repository 406A. The pre-fill engine 406 can take the domain output document, which includes the classified and categorized domain words that were extracted from the corpus of documents, to select questions from the set of pre-fill questions in the pre-fill question repository 406A. Based on the categories in the domain output document, pre-fill engine 406 can determine which of the selected questions are relevant and answer the relevant questions using the extracted domain data (e.g., as discussed in the context of at least FIG. 9). The seed dataset generator 403, when the accuracy of answers to the pre-fill questions goes below a threshold level, can reach back to the corpus of documents and identify additional datasets aligned with the relevant questions to generate further relevant data. The additional datasets can be identified by, for example, identifying concepts within the corpus of documents using the domain ontology. The pre-fill engine 406 can further determine whether additional relevant questions are needed using the performance monitor 406B and machine learning algorithms 411, based on new categories, new classifications or new terminology found by the document analyzer 405. The pre-fill engine 406 can use these questions and answer them using the data extracted. The pre-fill engine 406 can also store these new questions in the pre-fill question repository 406A (e.g., as discussed in the context of at least FIG. 9).

The seed dataset source 404 can be a database that stores data extracted by the document reader 405A within document analyzer 405 and used by the seed dataset generator 403 to generate additional relevant data. The seed dataset source 404 can further be used by the scoring engine 407 to generate a score that numerically represents a scoring analysis of the information used to answer relevant questions. The scoring analysis can depend on determining an information confidence level. The information confidence level is determined by analyzing the quality and quantity of words extracted, categorized, and classified by document analyzer 405. Determining the quality of words extracted, categorized, and classified can involve determining words in the document and that signal important information. Determining the quantity of the words extracted, categorized, and classified can involve counting a number of times a word was found in the corpus of documents. If the quality and quantity of words extracted are relatively low based on one or more thresholds (e.g., if the quantity of extracted words is below a threshold number of words, if a quality value of extracted words is below a threshold quality value, if a ratio of the quantity of extracted words to a total quantity of words is below a threshold ratio value), then a scoring analysis could not be done since there would not be enough information to calculate a score. The information confidence level analysis can further include determining how many relevant questions were found and answered.

The scoring analysis can then also include analyzing the answers to the relevant questions by determining if the answers contain dispositive information known to affect the overall analysis. For example, if a car insurance analysis involves answers to questions related to the type of driver and determines that the driver has multiple speeding tickets and car accidents, then the score provided by the scoring analysis would show that the insurance risk is high by displaying a low score. Similarly, if the insurance risk is low, the score displayed would be high. This is taking into consideration all the data extracted, categorized, and classified. For example, in the same analysis, the analysis may only find that there is no speeding tickets or car accidents but very little other information, like whether the driver has a driver's license, then not enough information is presented to give a high score. The document analyzer 405 has document reader 405A that can extract domain words from a corpus of documents using machine learning algorithms such as MLA 411 (e.g., as discussed in the context of at least FIG. 6). The document analyzer 405 further has document categorizer 405B that can categorize the extract domain words using machine learning algorithms 411 (e.g., as discussed in the context of at least FIG. 7). The document analyzer also has document classifier 405C that can classify the categorized domain words using machine learning algorithms 411 (e.g., as discussed in the context of at least FIG. 8). The document analyzer has performance monitor 405D that can be used by the document reader 405A, document categorizer 405B, and document classifier 405C to determine if a new domain word is detected, a new category is detected, and/or if a new classification is detected, respectively.

Scoring engine 407 takes the information from the seed dataset source 404 to determine, based on the data extracted and questions answered what type of risk the documents show. For example, if the pre-fill engine 406 and the document analyzer 405 extract data that is determined to show a poor evaluation, then the scoring engine 407 can provide a low score, and if it shows a positive evaluation, then it can show a high score (e.g., as discussed in the context of at least FIG. 9).

The GUI generator 408 can include a user interface that generates a display for the administrator to interact with the system (e.g., as discussed in the context of at least FIG. 12-15). The API server 409 can be an interface between the GUI generator 408 and the display 410. The display 410 can show the user interface generated by the GUI generator 408 to the administrator (e.g., as discussed in the context of at least FIG. 12-15).

Machine learning algorithms 411 can include one or more artificial intelligence or "machine learning" algorithms are able to use data to progressively improve performance of one or more tasks without being explicitly programmed to perform the task(s). Machine learning algorithms 411 can include, but are not limited to, decision tree learning algorithms, association rule learning algorithms, artificial neural networks algorithms, deep learning algorithms, inductive logic programming, support vector machines, clustering algorithms, Bayesian networks algorithms, reinforcement learning algorithms, representation learning algorithms, similarity learning algorithms, sparse dictionary learning algorithms, genetic algorithms, rule-based machine learning algorithms, learning classifier systems, and feature selection approach algorithms. Machine learning algorithms 411 can use one or more different machine learning techniques; for example, machine learning algorithms 411 can include both supervised learning and unsupervised learning techniques. Supervised learning techniques can include semi-supervised learning, active learning, and reinforcement learning techniques. Unsupervised learning techniques can include one or more techniques based on anomaly detection algorithms, neural networks, and clustering algorithms like k-nearest neighbors algorithm, hierarchical clustering algorithms, Gaussian mixture models, self-organizing maps, and/or Hidden Markov models. Machine learning algorithms 411 can provide outputs including outputs for classification, regression, clustering, density estimation, and/or dimensionality reduction of input data.

Figure 5:
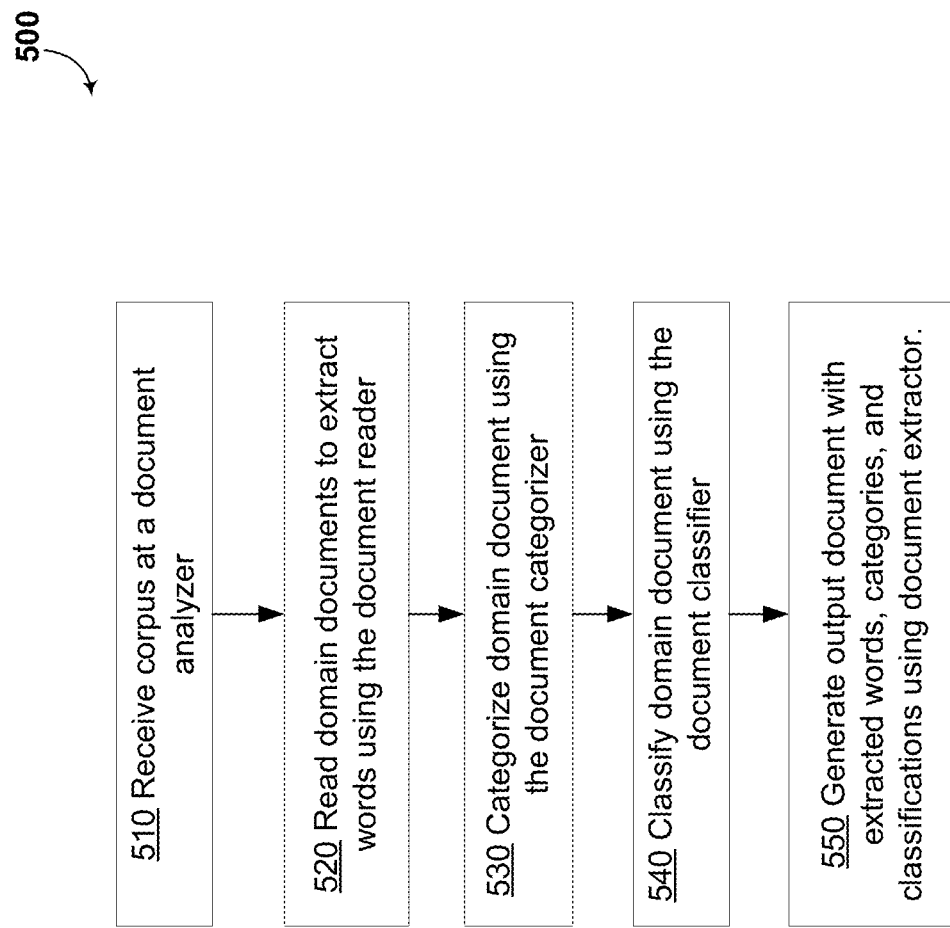
FIG. 5 is a flow chart representing an example method for extracting data from domain documents, according to an example embodiment.

FIG. 5 is a flow chart of example method 500 to be performed by a document analyzer, such as document analyzer 405, in accordance with at least some example embodiments. Method 500 can begin at block 510, where the document analyzer can receive a corpus of documents to be analyzed. At block 520, the document reader within the document analyzer can read a domain document by extracting each word in the domain document using the domain semantic dictionary 401. This is done comparing words in the domain document to words in domain semantic dictionary 401 and extracting words from the domain document that match words domain semantic dictionary 401. For example, if the domain is home insurance, then the domain semantic dictionary 401 will include words that relate to home insurance, like fire protection, flood records, hurricane zones, permits, home value, number of floors, if there is a basement, and/or various other words or terms that can provide information about insuring a home. At block 530, the document categorizer within the document analyzer can further categorize the domain document using the domain ontology 402 and machine learning algorithms 411. The document analyzer, for example, using extracted words and phrases from a given document, while maintaining the document structure, determines to which category best-fit the words and phrases. For example, the analyzer will take a set of words and phrases like fire alarm, roof age, and house, and determine if they best fit the categories available, for example, life insurance or home insurance. In another example, if the analysis includes life insurance, the categories can include a medical record category that can include any extracted data that relates to the applicant's medical records. This can include last doctor's visit, surgeries, recorded medical problems, family background.

At block 540, the document classifier within the document analyzer can further classify domain document into classifications that contain domain-specific categories. This is done by analyzing the words extracted, the categories used, and determining which class each best-fit the available categories. For example, if the analysis includes life insurance and the categories include medical records, age, sex, and drug use, the classification can include a health classification that can include any category that relates to the applicant's health. This can include medical records and drug use. At block 550, the document analyzer can generate an output document with the extracted words, categories, and classifications.

Figure 6:
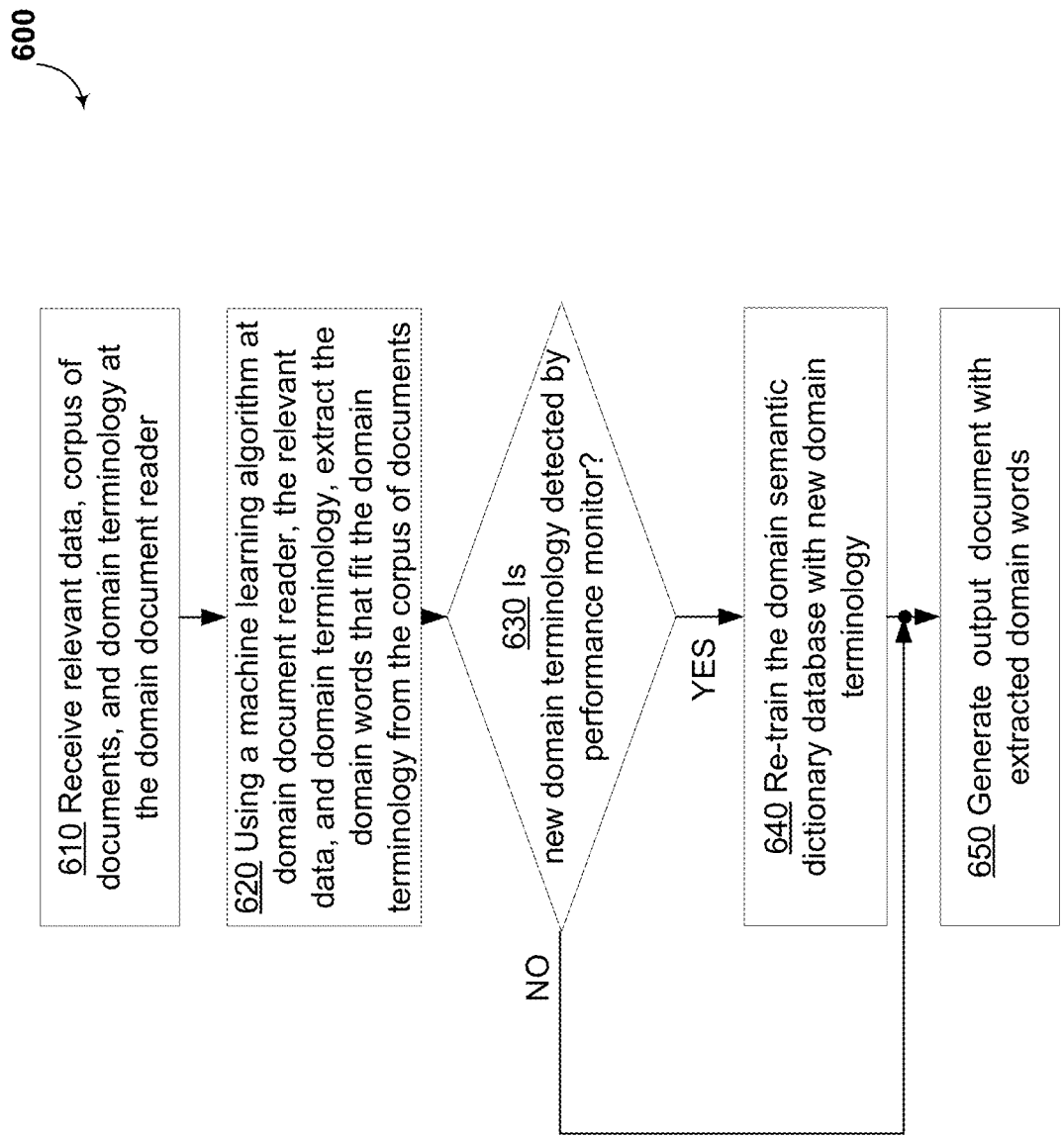
FIG. 6 is a flowchart of an example method, according to an example embodiment.

FIG. 6 is a block diagram of an example method 600 to be performed by a domain document reader, such as the document reader 405A within the document analyzer 405, in accordance with at least some example embodiments. Method 600 can begin at block 610, where the domain document reader can receive relevant data, a corpus of documents, and domain terminology to be analyzed. The corpus of documents can include legal documents, invoices, quotes, contracts, reports, spread sheets, certificates, permits, forms, applications, guarantee, agreements, and/or architectural plans. At block 620, the domain document reader, using machine learning algorithms 411, the relevant data, and domain terminology, can extract the domain words that fit the domain terminology from the corpus of documents. Word extraction can involve using the domain terminology and relevant data to search for words that are the same or similar as the terminology and are the same or similar to the relevant data.

At block 630, the document analyzer's performance monitor determines from the, whether new domain words or terminology are detected in the domain words extracted at block 620. This is done by determining if one or more new words are found that is relevant to the analysis and not in the domain terminology database. For example, a new insurance term can been identified, such as the term "admission" which relates to hospital inpatient care for medical reasons. If the one or more new words are found, then block 640 can be executed. If no new words are found, then block 650 can be executed.

At block 640, the domain document reader re-trains the domain semantic dictionary database with the new domain term. The domain semantic dictionary database can be re-trained by, for example, re-running a language model and further continuing to improve the language model. At block 650, the domain document reader generates an output document with the extracted domain words. In some examples, the extracted domain words can be output using other techniques than an output document; e.g., output to a display, a data structure, application programming interface, etc.

Figure 7:
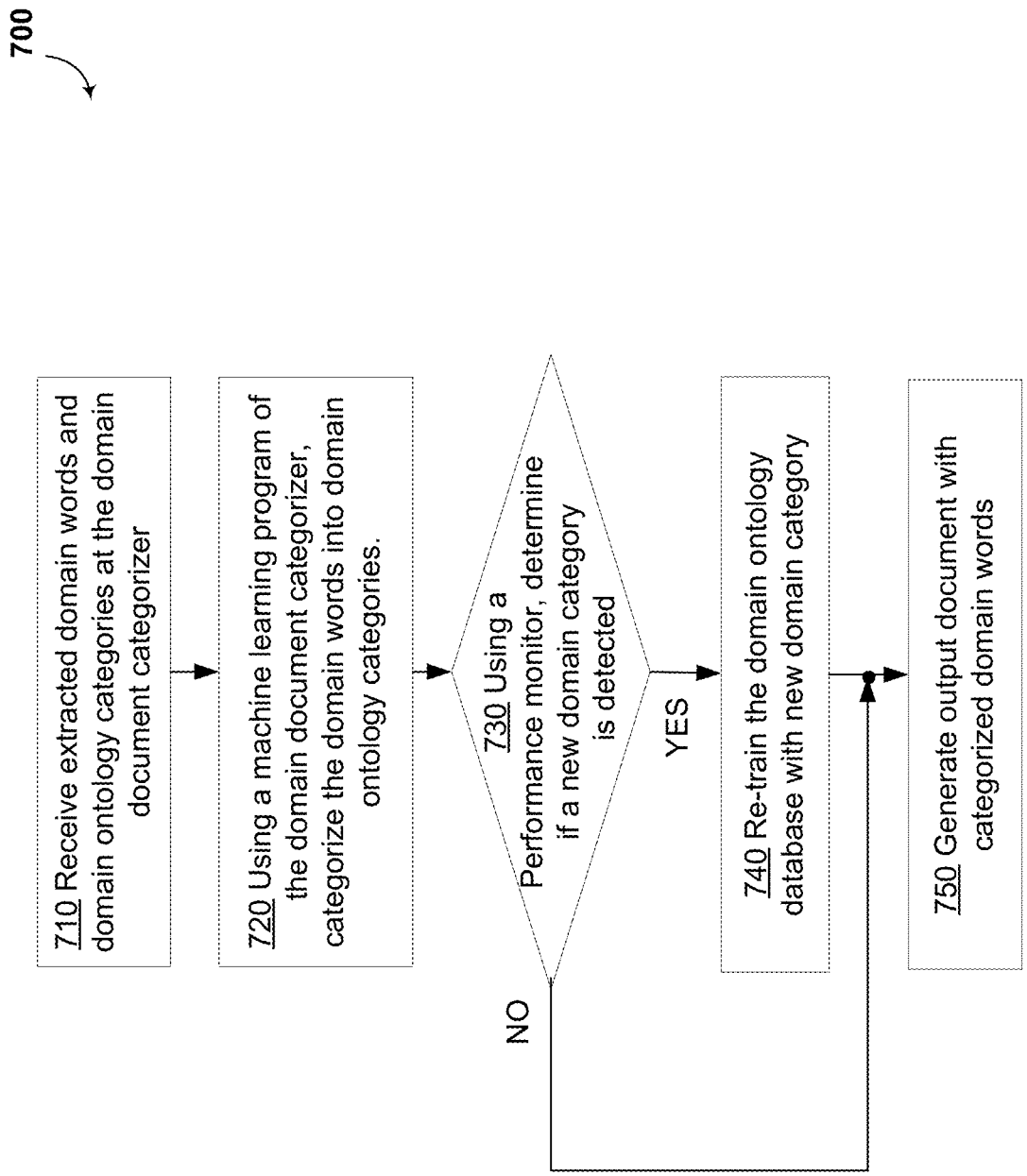
FIG. 7 is a flowchart of an example method for categorizing an electronic domain document, according to an example embodiment.

FIG. 7 is a block diagram of an example method 700 to be performed by a domain document categorizer, such as the document categorizer 405B within the document analyzer 405, in accordance with at least some example embodiments. Method 700 can begin at block 710, where the domain document categorizer can receive domain ontology categories and extracted domain words from block 650 of method 600 to be analyzed. For example, the domain words can be extracted using the procedures of method 600.

At block 720, the domain document categorizer can use machine learning algorithms 411 to categorize the domain words into domain ontology categories. At block 730, the document analyzer's performance monitor, determines whether a new domain category is detected. A new domain category is detected, in one example, when the words and phrases extracted do not best-fit the available ontology categories. For example, if the machine learning algorithm does not match enough words or phrases like bulldog, age, gender, and health to the available domain ontology categories like life insurance and house insurance. In such example, a new domain ontology category may be detected to cover pet health insurance. In another example, when one or more domain words that do not meet the characteristics of the domain ontology categories or that extracted words meet the characteristics of multiple domain ontology categories. For example, for a life insurance analysis, a new insurance category can been identified, such as the "genetic makeup" which relates to genetic information that may give information about the health risk an applicant can have. At that point, the domain document categorizer can determine what the words have in common and determine if a new category is detected. If the domain document categorizer detects a new category, then block 740 can be executed. If the domain document categorizer does not detect a new domain category, then block 750 can be executed.

At block 740, the domain document categorizer re-trains the domain ontology database with the new domain category. The domain ontology database can be re-trained by, for example, re-running a model and continuing to improve the model through training. At block 750, the domain document categorizer generates an output document with the extracted domain words. In some examples, the categorized domain words can be output using other techniques than an output document; e.g., output to a display, a data structure, application programming interface, etc.

Figure 8:
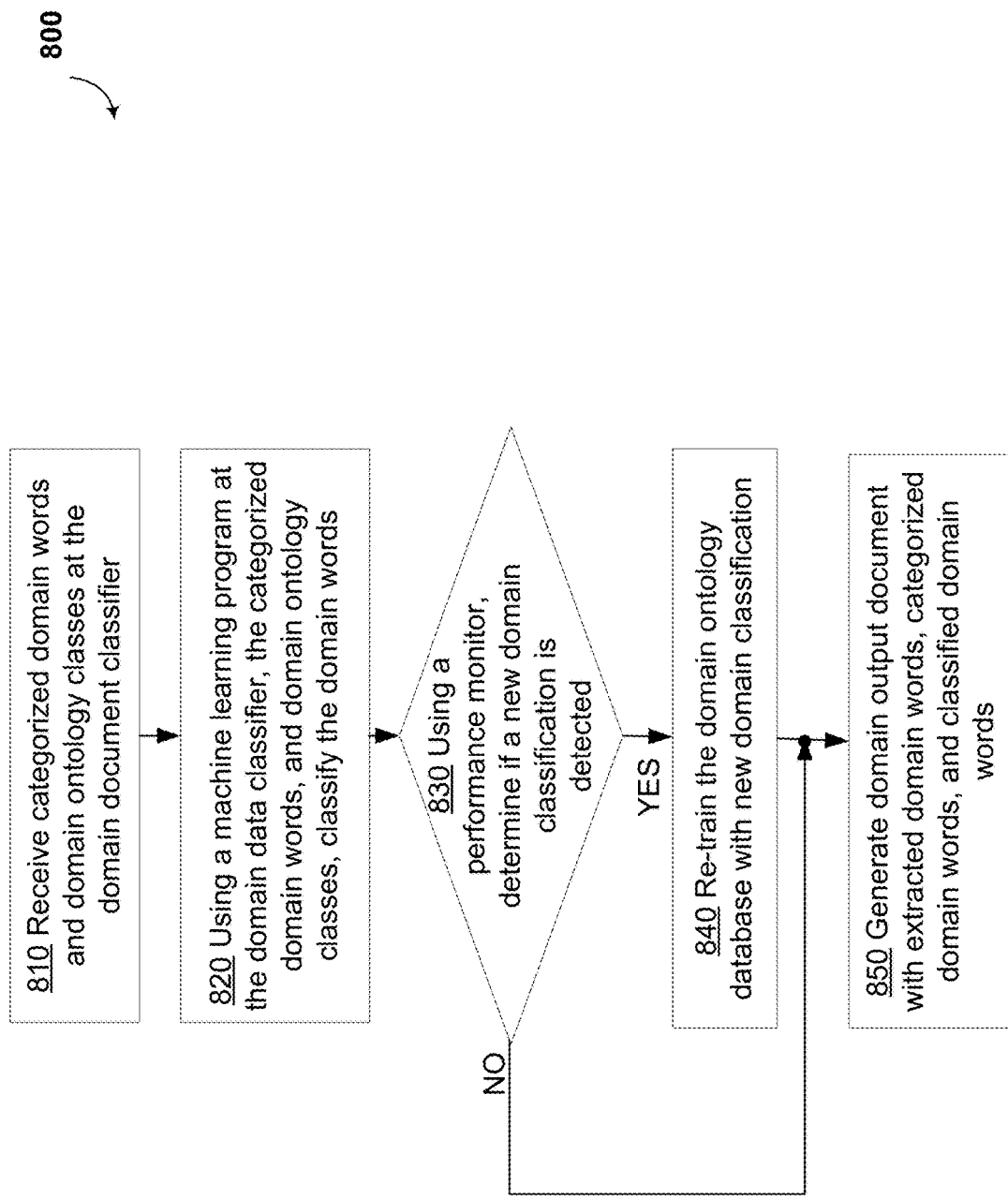
FIG. 8 is a flowchart of an example method for classifying domain document data, according to an example embodiment.

FIG. 8 is a block diagram of an example method 800 to be performed by a domain document classifier, such as the document classifier 405C within the document analyzer 405, in accordance with at least some example embodiments. Method 800 can begin at block 810, where the domain document classifier receives categorized domain words and domain ontology classifications to be analyzed. For example, domain words can be categorized using the procedures of method 700.

At block 820, the domain document classifier, using machine learning algorithms 411, the categorized domain words, and domain ontology classifications, can classify the domain categories into one or more classifications. At block 830, the document analyzer's performance monitor, determines if a new domain classification is detected. A new domain classification is detected, in one example, when there are various categories that do not meet the characteristics of an existing domain ontology classification or a category that meet the characteristics of multiple domain ontology classifications. A new domain classification is detected by determining if a new classification is found that is relevant to the analysis and not in the domain ontology database. For example, for a life insurance analysis, a new insurance classification can be identified, such as a "future indicators" classification that relates to information that gives an indication about future health of an applicant. This information can include information categorized into categories like genetic makeup, drug use, smoker, and other indicators that show indications about future health of the applicant. At that point, the domain document classifier can determine what the categories have in common and determine whether a new classification is detected. If a new classification is detected, then block 840 can be executed. If a new domain classification is not detected, then block 850 can be executed.

At block 840, the domain document classifier re-trains the domain ontology database by adding new domain classification to the database. At block 850, the domain document classifier generates a domain output document with the extracted domain words, categorized domain words, and classified domain words. In some examples, the extracted domain words, categorized domain words, and classified domain words can be output using other techniques than an output document; e.g., output to a display, a data structure, application programming interface, etc.

Figure 9:
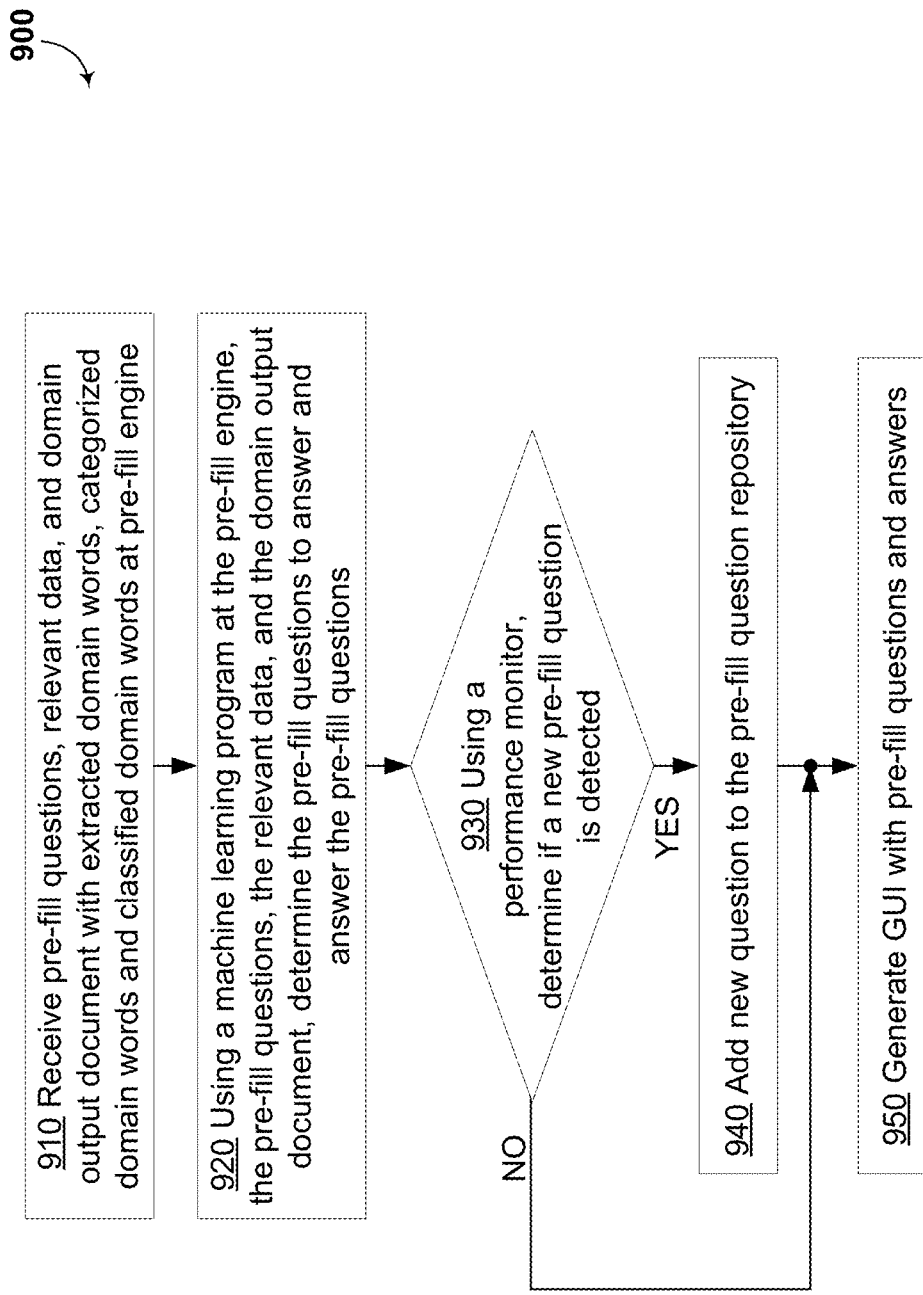
FIG. 9 is a flowchart of an example method for classifying domain document data, according to an example embodiment.

FIG. 9 is a block diagram of an example method 900 to be performed by a pre-fill engine, such as the pre-fill engine 406, in accordance with at least some example embodiments. Method 900 can being at block 910, where the pre-fill engine receives pre-fill questions, relevant data, and a domain output document with extracted domain words, categorized domain words, and classified domain words to be analyzed. For example, the domain output document with extracted domain words, categorized domain words, and classified domain words can be generated using method 800.

At block 920, the pre-fill engine, using a machine learning program such as machine learning algorithms such as MLA 411, the pre-fill questions, the relevant data, and the domain output document, determine which pre-fill questions are relevant and answer them. The relevant questions are determined using the categories and classifications used in the domain output document. At block 930, using the pre-fill engine's performance monitor, determine if a new pre-fill question is detected. A new question is detected, in one example, when there are various categories and classifications that do not answer the relevant pre-fill questions identified. This is done by determining if a new pre-fill question is found that is relevant to the analysis and not in the pre-fill question repository. In another example, when a form has a section to fill in certain information, a new pre-fill question can include a question for the certain information. For example, when analyzing home insurance, if a form has a section to fill in the estimated value of the house, a question can include what the estimated value of the house is. In another example, when analyzing car insurance, a form may have a formula to calculate, for example, the value of the car, the variables of the equation can be the used to determine new relevant questions. In an additional example, for a home insurance analysis, a new insurance question can been identified, such as the "how many smart smoke detectors are in the building" which is relevant to how home owners can react to a fire in the home. At that point, the domain document classifier can determine what the categories and classifications have in common and determine if a new pre-fill question is detected. In an additional example, the domain ontology can be adjusted to learn the concept the question is trying to answer. If a new pre-fill question is detected, then block 940 can be executed. If a new pre-fill question is not detected, then block 950 can be executed.

At block 940, the pre-fill question re-trains a pre-fill question repository by adding the new pre-fill question detected. At block 950, a display of a graphical user interface (GUI) is generated with the pre-fill questions and answers and subsequently displayed (e.g., as discussed in the context of at least FIG. 11-14). In some examples, the pre-fill questions and answers can be output using other techniques than a display; e.g., output to a file, a document, a data structure, application programming interface, etc.

Figure 10:
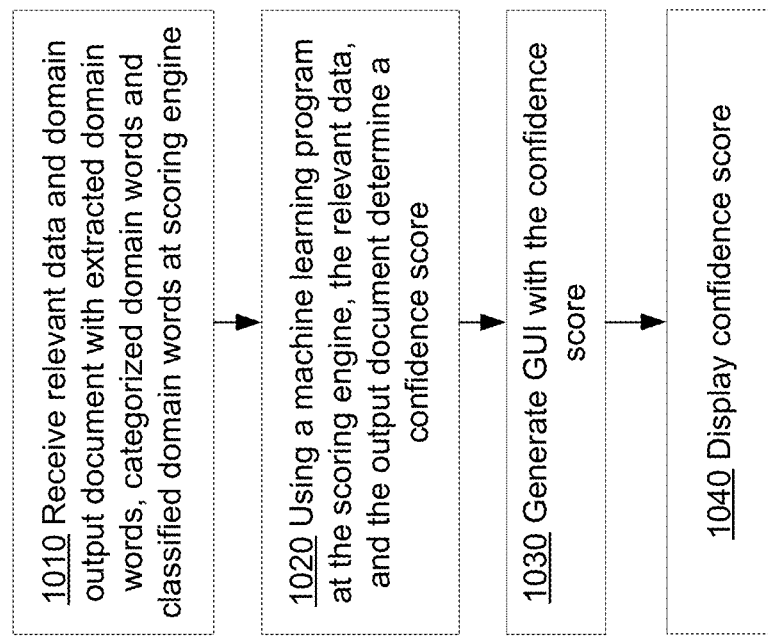
FIG. 10 is a flowchart of an example method for classifying domain document data, according to an example embodiment.

FIG. 10 is a block diagram of an example method 1000 to be performed by a scoring engine, such as the scoring engine 407, in accordance with at least some example embodiments. Method 1000 can begin at block 1010, where the scoring engine receives relevant data and a domain output document with extracted domain words, categorized domain words, and classified domain words. For example, the domain output document with extracted domain words, categorized domain words, and classified domain words can be generated using method 800.

At block 1020, the scoring engine, using machine learning program MLA 411, the relevant data and the domain output document, can determine a confidence score that represents a risk level that the system has for the documents analyzed. For example, if the documents relate to the risk to giving customer car insurance, the system will determine, based on the documents analyzed, the risk level that may be entailed by providing car insurance to the customer (e.g., as discussed in the context of at least FIG. 4). At block 1030, a GUI is generated with the confidence score. At block 1040, a display is generated to display the confidence score to a user (e.g., as discussed in the context of at least FIG. 11-15). In some examples, the confidence score can be output using other techniques than a display; e.g., output to a file, a document, a data structure, application programming interface, etc.

FIG. 11 shows a display 1110 of a user interface 1100 related to a user interface displaying data extracted from a set of documents and individual documents from the set of documents. The data can be extracted using the procedures of method 600. The display 1110 can have a structure output viewer 1120 and original document viewer 1130. The structure output viewer 1120 can display the data extracted from the set of documents. In the structure output viewer 1120, the table shows information related to auto insurance claims. The chart has three columns showing the total recovery, accident date, and claim status. The total recovery column shows amounts paid by an insurance company for the accident. The accident date shows dates when accidents occurred. The claim status column shows indicates status of claims; e.g., whether a claim is open, closer, or has another status. For example, in the first row of a table shown in structure output viewer 1120, data for a "CLOSED" claim indicates a recovery of "$8,717" for an accident on "Apr. 20, 2011." Similarly for the second claim in row three, data for a "CLOSED" claim indicates a recovery of "$18,700" for an accident on "Jun. 7, 2011." For the third claim in row four, data for a "CLOSED" claim indicates a recovery of "$2,311" for an accident on "Jul. 7, 2008." For the fourth claim in row five, data for an "OPENED" claim indicates a recovery of "$3,221" for an accident on "Dec. 30, 2017." For the fifth claim in row six, data for a "CLOSED" claim indicates a recovery of "$6,667" for an accident on "Oct. 5, 2005." For the sixth claim in row seven, data for a "CLOSED" claim indicates a recovery of "$55,133" for an accident on "Jul. 17, 2009."

The original document viewer 1130 can display one of the documents from the set of documents. In the example shown in FIG. 11, original document viewer 1130 shows a claim document for an auto insurance accident. Selecting a row of viewer 1120 can cause the related documents to be retrieved in original document viewer 1130. The user can compare the two viewers to verify that the information extracted from the documents is accurate. In the example shown in FIG. 11, original document viewer 1130 displays a customer claim document for an auto insurance accident corresponding to the sixth claim of structured document viewer 1120. For example, the document "Customer Claim" has a "Customer No. 755-1787" filed "Date: Jul. 17, 2009" by "Client Name: Jane Smith" having an "Address: 1717 Main Road Springfield" a "Recovery: $55,133" a "Status of Claim: Closed" with a "Comment: Car frame is completely destroyed. Car is totaled." and with a "Signature/John P/."

FIG. 12 shows a display 1210 of a user interface 1200 related to a set of relevant questions and corresponding answers for evaluating the documents. The relevant questions and corresponding answers can be determined using the procedures of method 900. The structure output viewer 1220 will have a column with a list of questions that the system finds relevant to be answered. The structure output viewer 1220 has a second column that can display the answers to the questions. The display 1210 can further allow the user to answer the displayed questions. The answers can then be used by the system to improve performance, to improve answering further questions, and to improve scoring. The system, in some examples, can also provide the answers to these questions using the extracted data and display them in display 1210. The structure output viewer 1220 displays questions related to building insurance. For example, in the second row of a table shown in structure output viewer 1220, data for a "Licensed Contractor?" indicates "Yes." Similarly for the second question in row three, the answer to question "Acquired Permit?" was "No." For the third question in row four, the answer to the question "Inspected before construction?" was "Yes." For the fourth question in row five, the answer to the question "Inspected after construction?" was "No." For the fifth question in row six, the answer to the question "Architectural plan?" was "Yes."

FIG. 13 shows a display 1310 of a user interface 1300 for a values viewer 1320. The values viewer 1320 can display the values of specific attributes from the set of documents. The attributes can be determined using the procedures of methods 500, 600, 700, 800, and/or 900. The values viewer 1320 can display attributes that represent information sought for an evaluation associated with the set of documents. In the example shown in FIG. 13, values viewer 1320 displays attributes related to a house insurance analysis for determine risk in insuring a house to allow an underwriter to determine the risk that the house would entail. The values viewer 1320 can also include values extracted from the corpus of documents for the attributes.

For example, the values viewer 1320 shows an extracted value of a "Year Built" attribute is "1985", an extracted value of a "Construction Type" attribute is "Wood", an extracted value of a "Number of Stories" attribute is "3", an extracted value of the "Roof Type" attribute is "Flat", and the extracted value of the "Roof Age" attribute is empty based on a lack of corresponding extracted information, and an extracted value of a "Pool" attribute is "1" representing one pool. The values viewer 1320 can also include a "D3" value column that provides information for each attribute based on an analysis of the documents. The "D3" value is different than the extracted value as the extracted value is the data directly extracted from a document and where the "D3" value is the value interpreted by the machine-learning algorithm from the set of documents. For example, the determined D3 value of the "Year Built" attribute is "1985", the extracted D3 value of the "Construction Type" attribute is empty based on a lack of corresponding extracted information, the extracted D3 value of the "Number of Stories" is "3", the extracted D3 value of the "Roof Type" is "Flat", and the extracted D3 value of the "Roof Age" attributed is "4", and the extracted D3 value of the "Pool" attribute is "1" representing one pool.

FIG. 14 shows a display 1410 of a user interface 1400 related to a score viewer. The score viewer 1420 has columns that display the confidence level that the system has related to each company it analyzed based on a set of documents. The score can be generated using the procedures of method 1000. The score viewer 1420 can have a column with a company's information listing all the companies it is analyzing. The column could also include individuals or properties. The score viewer 1420 can also have a d3 score that gives a confidence score for each company based on an analysis of the document set for each company. The score viewer 1420 can also have a description column that displays what the company was analyzed for and what the score relates to. For example, in the second row, the company "ABC Inc" had a "3/5" D3 score for a "Workers Comp" insurance analysis. For the third row, the company "WXY LLC" had a "5/5" D3 score for a "Car Accident" insurance analysis. For the fourth row, the company "QWE Inc" had a "1/5" D3 score for a "Flood" insurance analysis. For the fifth row, the company "APP LLP" had a "1/5" D3 score for a "Workers Comp" insurance analysis. For the sixth row, the company "VCR LLC" had a "2/5" D3 score for a "Hurricane" insurance analysis.

III. Example Web Pages for Effective Display of Information

As previously described, reading through documents used for underwriting business insurance can involve reading a wide variety of documents, including documents related to loss history, credit score, employment history, salary verification, financial statements, building permits, statements of values, insurance application forms, and health inspection documents, among many others. Because reading through these documents may be complex or unduly time consuming to perform manually, the embodiments described above provide systems and methods for extracting relevant data from formatted/non-formatted documents using machine learning algorithms. Generally speaking, the output from aforementioned machine learning algorithms could be viewed via a graphical interface, for example, the user interfaces described in FIGS. 11 to 14, and could provide an insurance underwriter with a greater context into insurance risks.

However, many graphical interfaces that facilitate the display of insurance information may be complex and confusing to all but the experienced user. Often, these interfaces provide an overwhelming amount of insurance information in the form of a single, excessively long webpage. Further, the information provided may be grouped into unintuitive categories, or even worse, not grouped into any categories at all. While the graphical interfaces may eventually provide the relevant information the insurance underwriter is looking for, the process of finding the information may unduly time consuming. Therefore, there exists a need for graphical interfaces that streamline an insurance underwriter's ability to quickly ascertain relevant information from a myriad of documents and data sources.

The embodiments herein provide graphical interfaces that can address these and other issues. In particular, the graphical interfaces described herein may group insurance information into information categories. The information categories may take the form of selectable cards. The selectable cards may be configured to allow a user to drill down into a detailed view for each respective information category. Advantageously, the insurance underwriter can focus on a single category of information, rather than being overwhelmed with information from multiple, disparate sources. Further, the graphical interfaces may be user-configurable to allow an insurance underwriter to customize the view to suite their idiosyncrasies. For example, the graphical interfaces may be customized the based on the particular role of the user. In one example, if an insurance agent is viewing the graphical interface, the agent might see insurance information displayed in such a way that is advantageous to their work. In another example, if an insurance manager is using the graphical interface, the manager might see the insurance information displayed in such a way that is advantageous to the group the manager is tasked with overseeing. It should be noted that as used herein, "information category" may refer to the ontology categories, classifications, and/or domain ontologies described above with respect to FIGS. 1-14.

Example graphical interfaces are shown below in FIGS. 15A, 15B, 16A, 16B, 16C, 16D, 16E, and 16F. Each of the graphical interfaces may have one or more locations in which to display information and/or one or more user-selectable items such as buttons or tabs. The layout and compilation of these interfaces may enable efficient review of pertinent insurance information without unduly confusing a user. Additionally, the layout may organize and arrange insurance information using intuitive visuals and easy to understand graphics. The graphical interfaces may be displayed on web pages or within native applications on tablet devices, mobile devices, desktop devices, and/or other types of computing devices. For example, the graphical interfaces described herein may be provided to users via client subsystem 302, perhaps generated by GUI generator 408 and then viewed on display 410.

Notably, the example graphical interfaces in FIGS. 15A, 15B, 16A, 16B, 16C, 16D, 16E, and 16F allow an insurance underwriter to properly assess the insurance risk for a particular entity, such as a trucking business or food delivery service. For the sake of simplicity, the description herein may refer to this particular entity as "the entity in question".

Figure 15A:
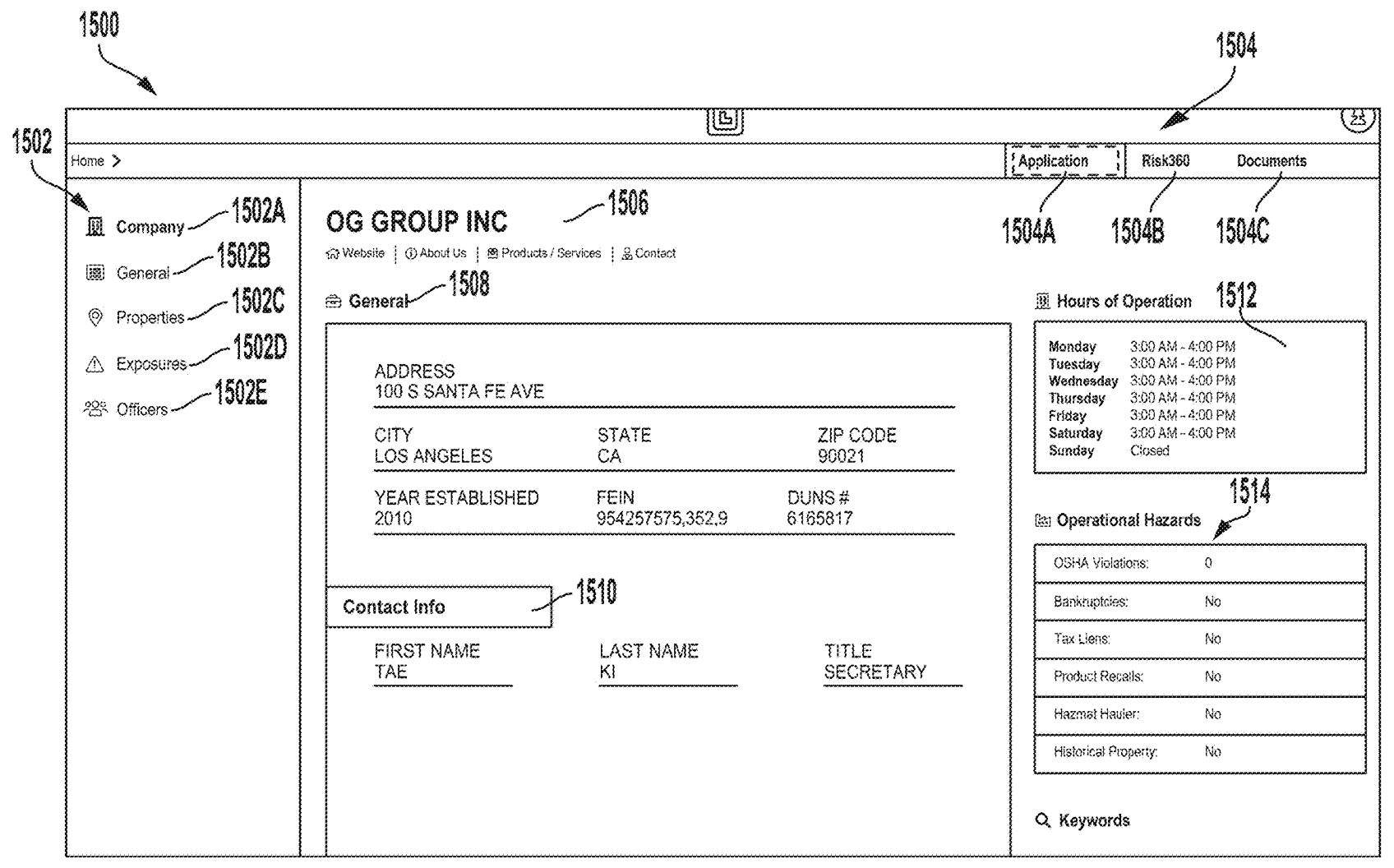

FIG. 15A depicts a detailed view of graphical interface 1500, according to example embodiments. Graphical interface 1500 includes navigation bar 1502, header bar 1504, heading 1506, general overview 1508, contact information 1510, hours of operation 1512, and operational hazards 1514.

Navigation bar 1502 is a selectable menu that allows a user to navigate to alternative graphical interfaces. In particular, navigation bar 1502 includes navigation selections 1502A, 1502B, 1502C, 1502D, and 1502E. Navigation selection 1502A may correspond to a "Company" interface, which displays company information related to the entity in question. Navigation selection 1502B may correspond to a "General" interface, which may display general questions/answers related to the entity in question. Navigation selection 1502C may correspond to a "Properties" interface, which may display real-estate properties owned or associated with the entity in question. Navigation selection 1502D may correspond to an "Exposures" interface, which may display hazards and other exposures related the entity in question. Navigation selection 150E may correspond to an "Officers" interface, which may display information related to employees of the entity in question. Notably, navigation selection 1502A is shown in a darker color to indicate that this selection's information is currently displayed on graphical interface 1500.

Header bar 1504 is also a selectable menu that allows a user to navigate to alternative graphical interfaces. In particular, header bar 1504 includes tabs 1504A, 1504B, and 1504C. Tab 1504A may correspond to an "Application" interface, which displays information related to an insurance application submitted by the entity in question. Tab 1504B may correspond to a "Risk" interface, which allows an insurance underwriter to dig down into risk details related to the entity in question. Tab 1504C may correspond to a "Document" interface, which may allow the insurance underwriter to manually upload documents related to the entity in question. Notably, tab 1504A is highlighted to indicate that this tab's information is currently displayed on graphical interface 1500.

Heading 1506 displays the name and various web links related to the entity in question. For example, links to the entity's (i) website, (ii) about page, (iii) products/services, and (iv) contact information are provided.

General overview 1508 provides general details related to the entity in question. As shown in FIG. 15A, these details include (i) an address, (ii) the year the entity was established, (iii) the Federal Employer Identification Number (FEIN) for the entity, and (iv) the Data Universal Numbering System (DUNS) number for the entity.

Contact information 1510 provides contact details for a representative of the entity in question. As shown in FIG. 15A, details for a representative named "Tae Ki" are provided.

Hours of operation 1512 indicates the hours that the entity in question operates. As shown in FIG. 15A, the entity in question operates Monday through Saturday, 3 AM-4 PM, but is closed on Sunday.

Operational hazards 1514 provides a summary of hazards related to the entity in question, including (i) the number of Occupational Safety and Health Administration (OSHA) violations, (ii) whether the entity is in bankruptcy, (iii) whether any tax liens are against the entity, (iv) whether the entity has any product recalls, (v) whether the entity has a hazmat hauler, and (vi) whether the entity owns a historic property.

In examples, the information to populate graphical interface 1500 may be retrieved by admin subsystem 301 from data sources 201a, 201b, . . . 201n, processed and grouped into information categories via methods 600, 700, 800, and 900, and then displayed via client subsystem 302 as described above. Notably, the presentation of graphical interface 1500 is used for the purpose of example and is not intended to be limiting. Other types of information may also be displayed on graphical interface 1500.

Figure 15B:
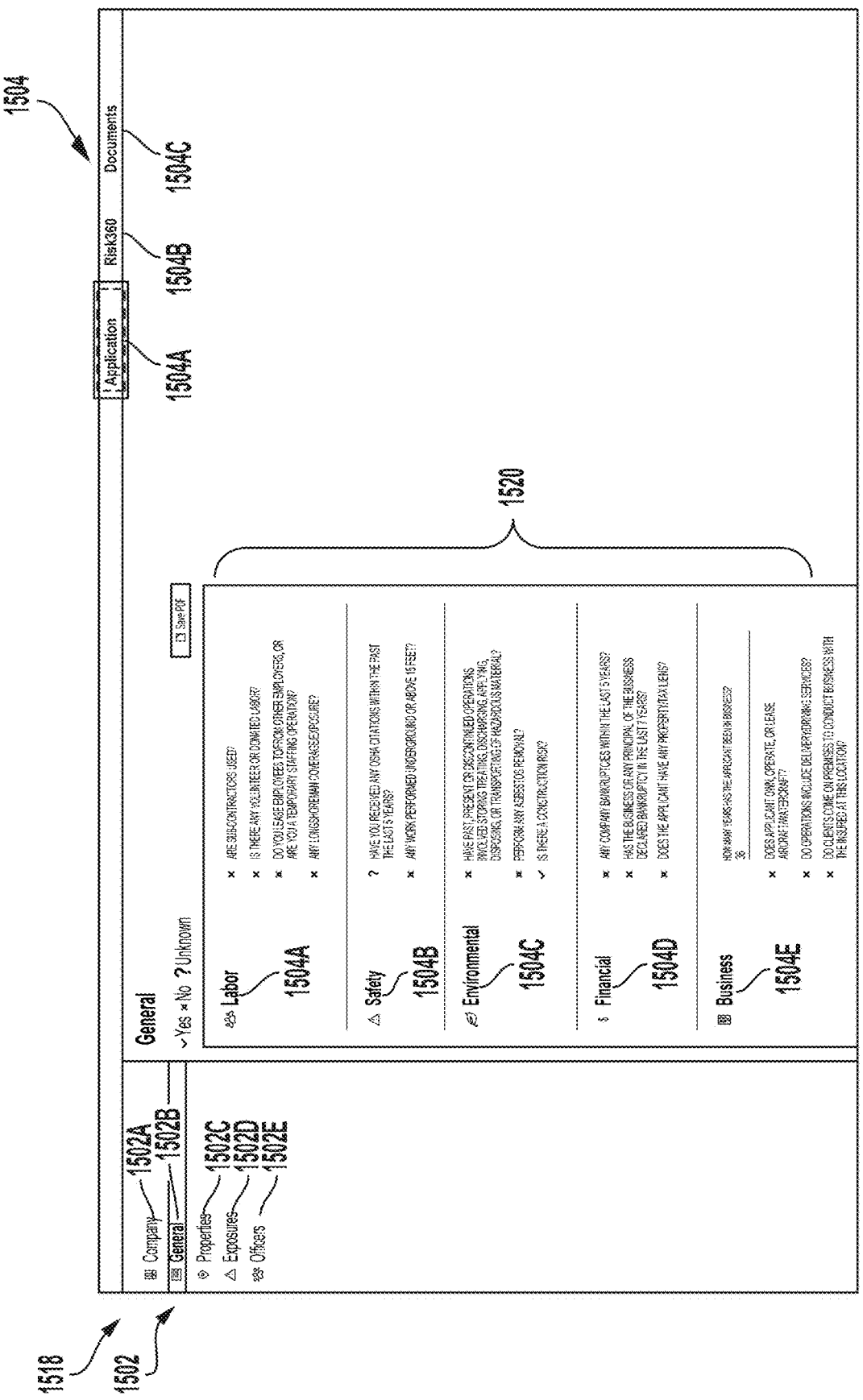

FIG. 15B depicts a view of graphical interface 1518, according to example embodiments. The elements of FIG. 15B may be displayed, for example, when a user selects navigation selection 1502B from navigation bar 1502. To that end, navigation selection 1502B is shown in a darker color to indicate that this selection's information is currently displayed. Graphical interface 1612 includes the same navigation bar 1502 and header bar 1504 as FIG. 15A, but also includes answers 1520.

Answers 1520 may include answers to questions asked by an insurance underwriter when assessing risk for the entity in question. Answers 1520 are similar to the previously described display 1210 of user interface 1200, which depicts a set of relevant questions and corresponding answers using the procedures of method 900. However, answers 1520 provide a significant improvement to display 1210 by categorizing questions/answers into informative categories. As shown, answers 1520 are grouped into labor category 1520A, safety category 1520B, environmental category 1520C, financial category 1520D, and business category 1520E. Advantageously, this improved interface provides an insurance underwriter with an intuitive grouping of questions/answers to allow the insurance underwriter to more easily assess risk. The grouping of relevant questions/answers may be performed, for example, through methods 600, 700, 800, and 900 as described above.

By using graphical interfaces shown in FIGS. 15A and 15B, an insurance underwriter may more easily obtain a high level overview of common information, metrics, and questions related to the entity in question. However, if the insurance underwriter wishes to obtain further details, they may click or otherwise select header selection 1504B.

Figure 16A:
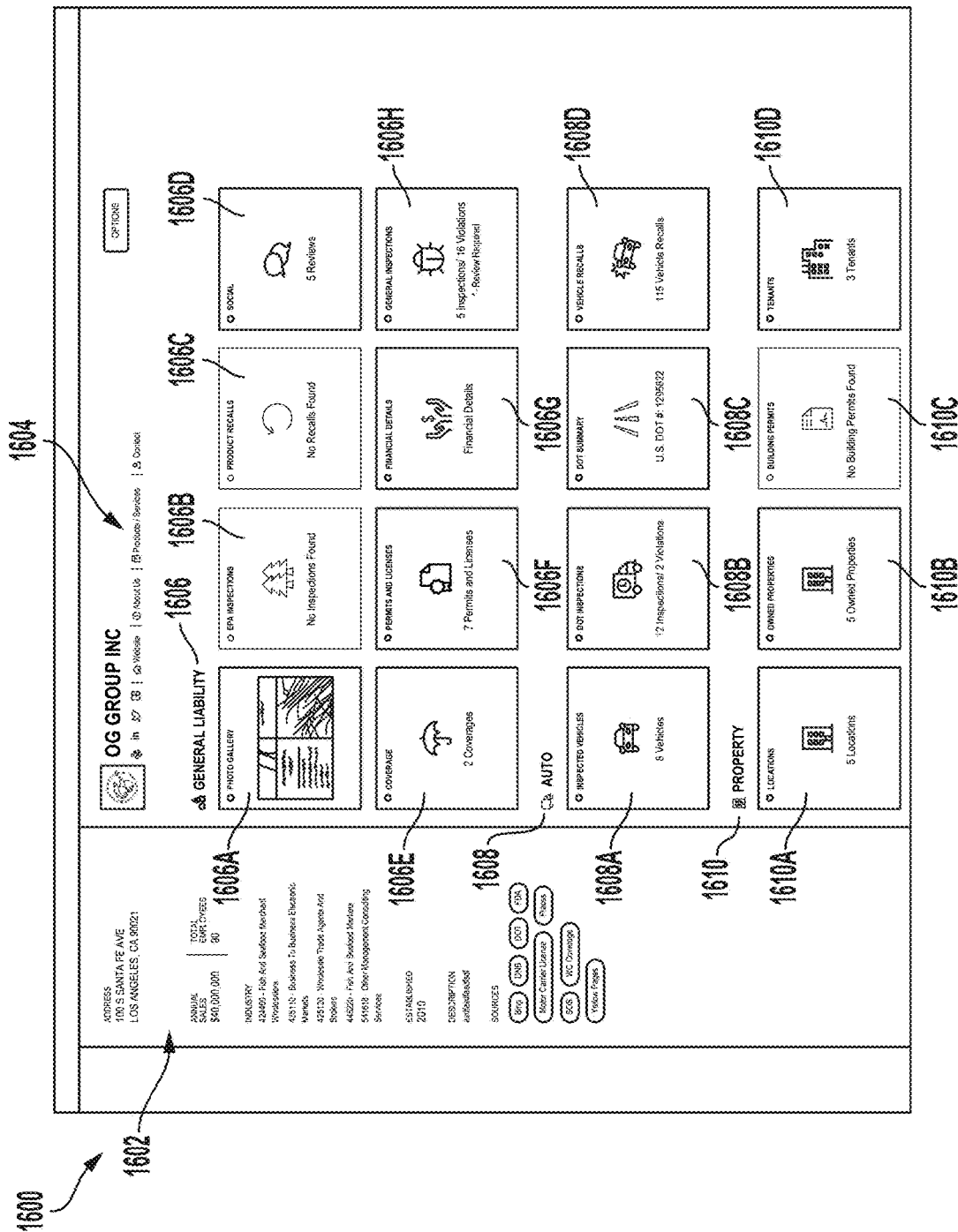

FIG. 16A depicts a view of graphical interface 1600, according to example embodiments. The elements of FIG. 16A may be displayed, for example, when a user selects tab 1504B from graphical interface 1500 shown in FIG. 15A or graphical interface 1518 shown in FIG. 15B. Graphical interface 1600 is shown to include summary 1602, header 1604, section headers 1606, 1608, 1610, cards 1606A, 1606B, 1606C, 1606D, 1606E, 1606F, 1606G, 1606H, 1608A, 1608B, 1608C, 1608D, 1610A, 1610B, 1610C, and 1610D.

Summary 1602 depicts summarized information related to the entity in question. For example, the entity's (i) address, (ii) annual sales, (iii) total employees, (iv) industry categorization, (v) date of establishment, and (vi) a brief description are provided. Additionally, summary 1602 provides various source icons, each corresponding to a data source. For example, source icons for "Bing", "DNB", "DOT", "Yellow Pages" and others are provided. Each of these source icons may correspond to data sources that provide the information to populate entries in the graphical interfaces shown in FIGS. 16A, 16B, 16C, 16D, 16E, and 16F. Moreover, each of these source icons may correspond to the aforementioned data sources 201a, 201b, . . . 201n. Advantageously, by providing the insurance underwriter with a glimpse into which data sources are being used, the insurance underwriter can better understand the extent to which the data displayed in FIGS. 16A, 16B, 16C, 16D, 16E, and 16F is genuine and accurate.

Similar to heading 1506, header 1604 displays the name and various web links related to the entity in question. For example, links to the entity's website, "about" page, products/services, and contact information are provided.

Section headers 1606, 1608, and 1610 may correspond to overarching information categories. As used herein, an overarching information category refers to a grouping of information categories that have a similar ontology. For example, section header 1606 is shown to represent a "General liability" overarching category, section header 1608 is shown to represent a "Auto" overarching category, and section header 1610 is shown to represent a "Property" overarching category. Other overarching categories may exist.

Cards 1606A, 1606B, 1606C, 1606D, 1606E, 1606F, 1606G, 1606H, 1608A, 1608B, 1608C, 1608D, 1610A, 1610B, 1610C, and 1610D may be selectable graphical representations of information categories. As discussed previously, selecting a given card allows a user to drill down into a detailed view for the given card's respective information category. By doing this, the insurance underwriter can focus on a single category of information, rather than being overwhelmed with information from multiple, disparate sources.

As also shown in FIG. 16A, each card may be placed under a section header that corresponds to an overarching category for that card's respective information category. For example, cards 1606A, 1606B, 1606C, 1606D, 1606E, 1606F, 1606G, and 1606H are placed under section header 1606 to indicate that they fall under the "General liability" overarching category. Cards 1608A, 1608B, 1608C, and 1608D are placed under section header 1608 to indicate that they fall under the "Auto" overarching category. And cards 1610C and 1610D are placed under section header 1610 to indicate that they fall under the "Property" overarching category.

Figure 16B:

FIG. 16B depicts a detailed view of graphical interface 1612, according to example embodiments. The elements of FIG. 16B may be displayed, for example, when a user selects card 1606H from graphical interface 1600 shown in FIG. 16A. Graphical interface 1612 includes the same summary section 1602 and header 1604 as FIG. 16A, but also includes table 1614, table entry 1616, and exit button 1618.

Table 1614 may include one or more table rows, including table row 1616. Each table row may include information related to an inspection and violation for the entity in question. This information, located in the columns of table 1614, indicates (i) the date of the inspection, (ii) the inspection ID, (iii) the inspection type, (iv) the location of the inspection, (v) the violation details and (vi) the description of the inspection. Advantageously, by displaying all inspections and violations in a single, cohesive view, the insurance underwriter can better understand the total risk associated with the entity in question.

Similar to the graphical interfaces described above, the information to populate table 1614 may be retrieved by admin subsystem 301 from data sources 201a, 201b, . . . 201n, processed and grouped into information categories via methods 600, 700, 800, and 900, and then displayed via client subsystem 302 as described above.

After viewing the information in graphical interface 1612, the user may wish to select another card from graphical interface 1600 to view other information. To achieve this, the user may select exit button 1618 (or alternatively press the ESC key on a keyboard). This action will return the user to graphical interface 1600 shown in FIG. 16A. From there, the user can select another card to view.

Figure 16C:
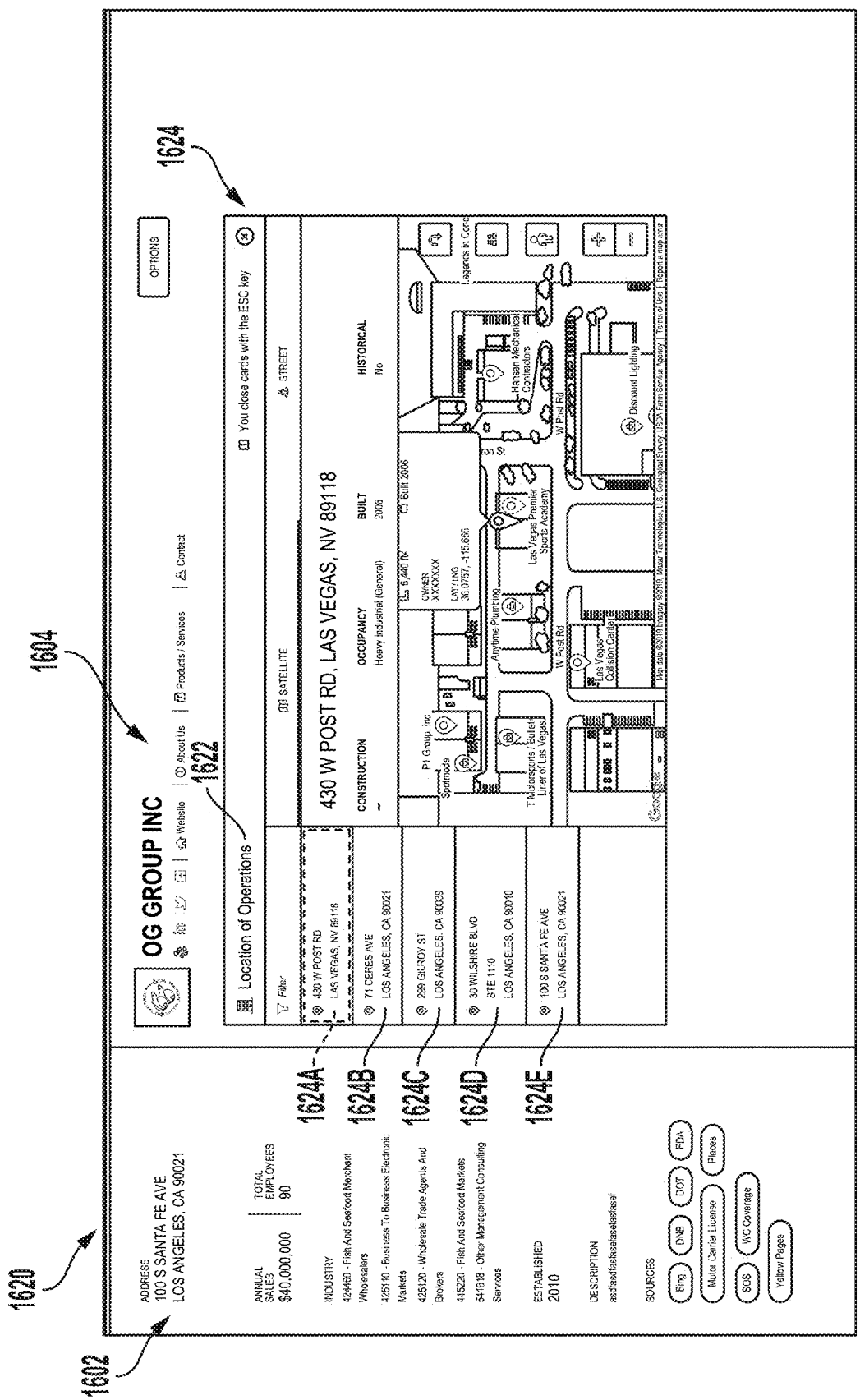

FIG. 16C depicts a detailed view of graphical interface 1620, according to example embodiments. The elements of FIG. 16C may be displayed, for example, when a user selects card 1610A from graphical interface 1600 shown in FIG. 16A. Graphical interface 1620 includes the same summary section 1602 and header 1604 as FIG. 16A, but also includes map 1622 and exit button 1624.

Map 1622 includes selectable buttons for locations 1624a, 1624b, 1624c, 1624d, and 1624e. Each location may correspond to a physical location associated with the entity in question. For example, if the entity in question is a clothing retailer, locations 1624a, 1624b, 1624c, and 1624d may correspond to physical stores of the retailer, while location 1624e may correspond to a warehouse for the retailer. Advantageously, by displaying all locations in a single, cohesive view, the insurance underwriter can better understand the total property risk associated with the entity in question.

Upon a user clicking or otherwise selecting one of the selectable buttons, display 1624F may generate a detailed view of the selected location. For example, display 1624F shows a detailed view for location 1624A, including a (i) geographical map, (ii) information related to the date the property was built, (iii) the occupancy type of the property, and (iv) whether the property is a historical landmark. The information to populate display 15624F may be retrieved from a remote data source, perhaps by querying an Application Programming Interface (API) provided by GOOGLE MAPS© or another mapping service.

Similar to the graphical interfaces described above, the information to populate map 1622 may be retrieved by admin subsystem 301 from data sources 201a, 201b, . . . 201n, processed and grouped into information categories via methods 600, 700, 800, and 900, and then displayed via client subsystem 302 as described above.

After viewing the information in graphical interface 1620, the user may wish to select another card from graphical interface 1600 to view other information. To achieve this, the user may select exit button 1624 (or alternatively press the ESC key on a keyboard). This action will return the user to graphical interface 1600 shown in FIG. 16A. From there, the user can select another card to view.

FIG. 16D depicts a detailed view of graphical interface 1626, according to example embodiments. The elements of FIG. 16D may be displayed, for example, when a user selects card 1606G from graphical interface 1600 shown in FIG. 16A. Graphical interface 1626 includes the same summary section 1602 and header 1604 as FIG. 16A, but also includes financial details 1628 and exit button 1630.

Financial details 1628 include financial categories 1628a, 1628b, and 1628c. Each financial category underscores important pecuniary details related to the entity in question. For example, financial category 1628A contains date related details for the entity in question, including (i) the data universal numbering system (DUNS) number, (ii) the control year, (ii) the year the entity started, and (iv) the last revision date of data associated with the entity. Financial category 1628B relates to net worth related details of the entity in question, including (i) overall sales, (ii) number of employees, (iii) whether the entity is in bankruptcy, and (iv) whether the entity has any liens against it. Financial category 1628C relates to credit score details of the entity in question, including (i) payroll numbers, (ii) the status of the entity in questions, (iii) the standard industrial classification (SIC) code for the entity in question, and (iv) the line of business of the entity in question. Other financial categories and details may exist. Advantageously, by displaying all financial details in a single, cohesive view, the insurance underwriter can better understand the total risk associated with the entity in question.

Similar to the graphical interfaces described above, the information to populate financial details 1628 may be retrieved by admin subsystem 301 from data sources 201a, 201b, 201n, processed and grouped into appreciated information categories via methods 600, 700, 800, and 900, and then displayed via client subsystem 302 as described above.

After viewing the information in graphical interface 1626, the user may wish to select another card from graphical interface 1600 to view other information. To achieve this, the user may select exit button 1630 (or alternatively press the ESC key on a keyboard). This action will return the user to graphical interface 1600 shown in FIG. 16A. From there, the user can select another card to view.

Figure 16E:
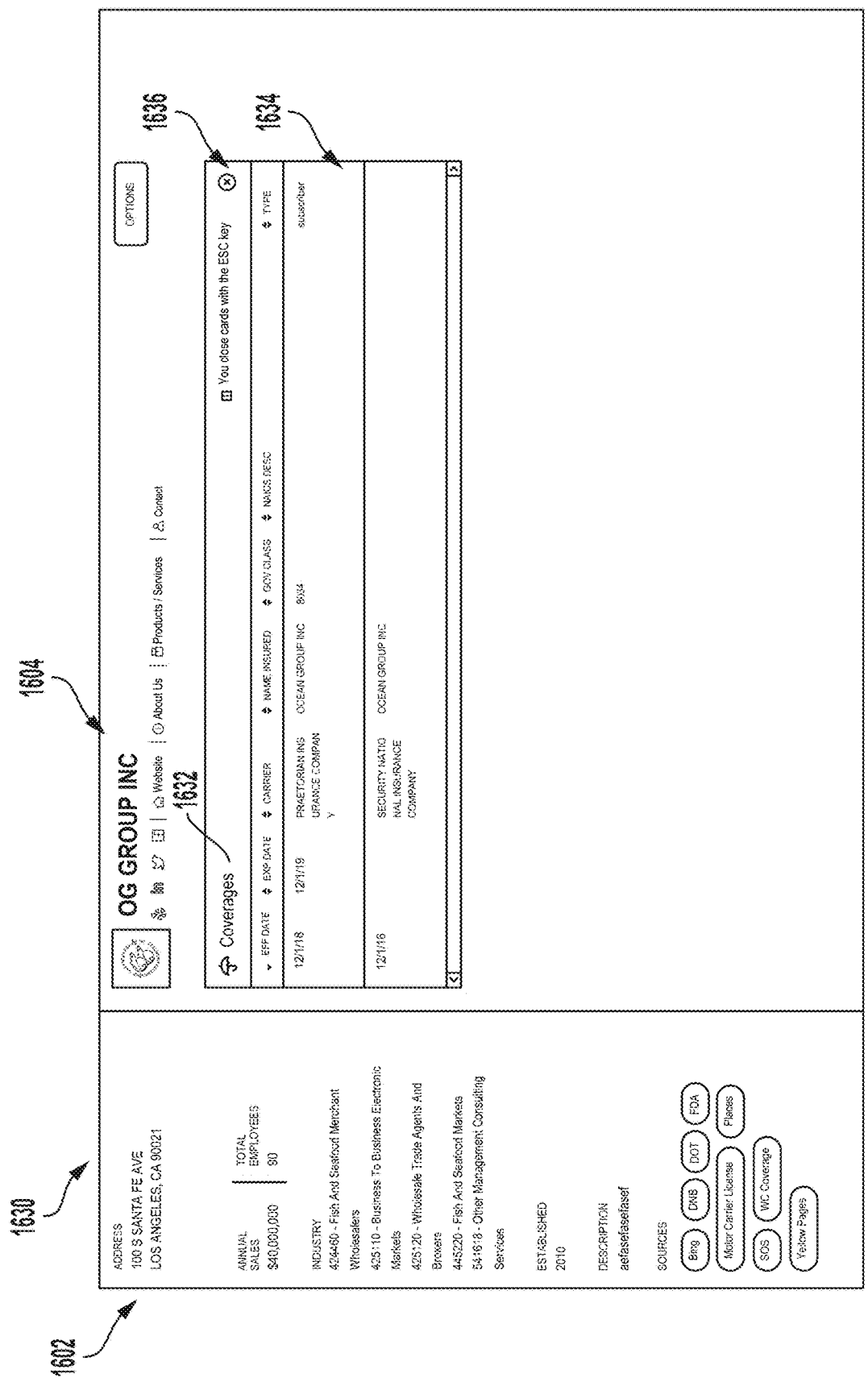

FIG. 16E depicts a detailed view of graphical interface 1630, according to example embodiments. The elements of FIG. 16E may be displayed, for example, when a user selects card 1606E from graphical interface 1600 shown in FIG. 16A. Graphical interface 1630 includes the same summary section 1602 and header 1604 as FIG. 16A, but also includes table 1632, table entry 1634, and exit button 1636.

Table 1632 may include one or more table rows, including table row 1634. Each table row may include information related to an insurance coverage for the entity in question. This information, located in the columns of table 1632, may include (i) the effective date of the insurance coverage, (ii) the expiration date of the coverage, (iii) the carrier of the coverage (iv) the name of the insured entity (v) the government classification of the coverage and (vi) one or more North American Industry Classification Code (NAICS) codes for the entity in question. Advantageously, by displaying all insurance coverages in a single, cohesive view, the insurance underwriter can better understand the total risk associated with the entity in question.

Similar to the graphical interfaces described above, the information to populate table 1632 may be retrieved by admin subsystem 301 from data sources 201a, 201b, . . . 201n, processed and grouped into appreciated information categories via methods 600, 700, 800, and 900, and then displayed via client subsystem 302 as described above.

After viewing the information in graphical interface 1630, the user may wish to select another card from graphical interface 1600 to view other information. To achieve this, the user may select exit button 1636 (or alternatively press the ESC key on a keyboard). This action will return the user to graphical interface 1600 shown in FIG. 16A. From there, the user can select another card to view.

Figure 16F:

FIG. 16F depicts a detailed view of graphical interface 1638, according to example embodiments. The elements of FIG. 16F may be displayed, for example, when a user selects card 1608B from graphical interface 1600 shown in FIG. 16A. Graphical interface 1638 includes the same summary section 1602 and header 1604 as FIG. 16A, but also includes table 1640, table row 1642, and exit button 1644.

Table 1640 may include one or more table rows, including table row 1642. Each table row may include information related to a Department of Transportation (DOT) inspection and violation for the entity in question. This information, located in the columns of table 1640, may include (i) the date of the DOT inspection, (ii) the inspection ID, (iii) the location of the inspection, (iv) the violation details, (v) the description of the incident, and (vi) whether the inspection and violation involved hazardous materials (HAZMATS).

Advantageously, by displaying all DOT inspections and violations in a single, cohesive view, the insurance underwriter can better understand the total risk associated with the entity in question.

Similar to the graphical interfaces described above, the information to populate table 1640 may be retrieved by admin subsystem 301 from data sources 201*a*, 201*b*, . . . 201*n*, processed and grouped into appreciated information categories via methods 600, 700, 800, and 900, and then displayed via client subsystem 302 as described above.

Table 1640 may also contain additional rows that are accessible via the "Previous" and "Next" buttons at the bottom of table 1640. These buttons allow the user to view multiple pages of table 1640. This may be beneficial when table 1640 displays a large number of DOT inspections and violations.

After viewing the information in graphical interface 1638, the user may wish to select another card from graphical interface 1600 to view other information. To achieve this, the user may select exit button 1644 (or alternatively press the ESC key on a keyboard). This action will return the user to graphical interface 1600 shown in FIG. 16A. From there, the user can select another card to view.

By using the graphical interfaces described above, arbitrarily complex pieces of insurance information can be rapidly aggregated and displayed. Advantageously, an insurance underwriter no longer needs to spend time synthesizing disparate pieces of information, but instead can be guided through multiple information categories via appropriate tables, buttons, and other interface elements. As a result, the insurance underwriter saves a significant amount of time. Note that the web pages above are presented merely for purposes of illustration and are not intended to be limiting. Other web pages including alternative arrangements of information may also exist.

IV. Example Methods of Operation

Figure 17:
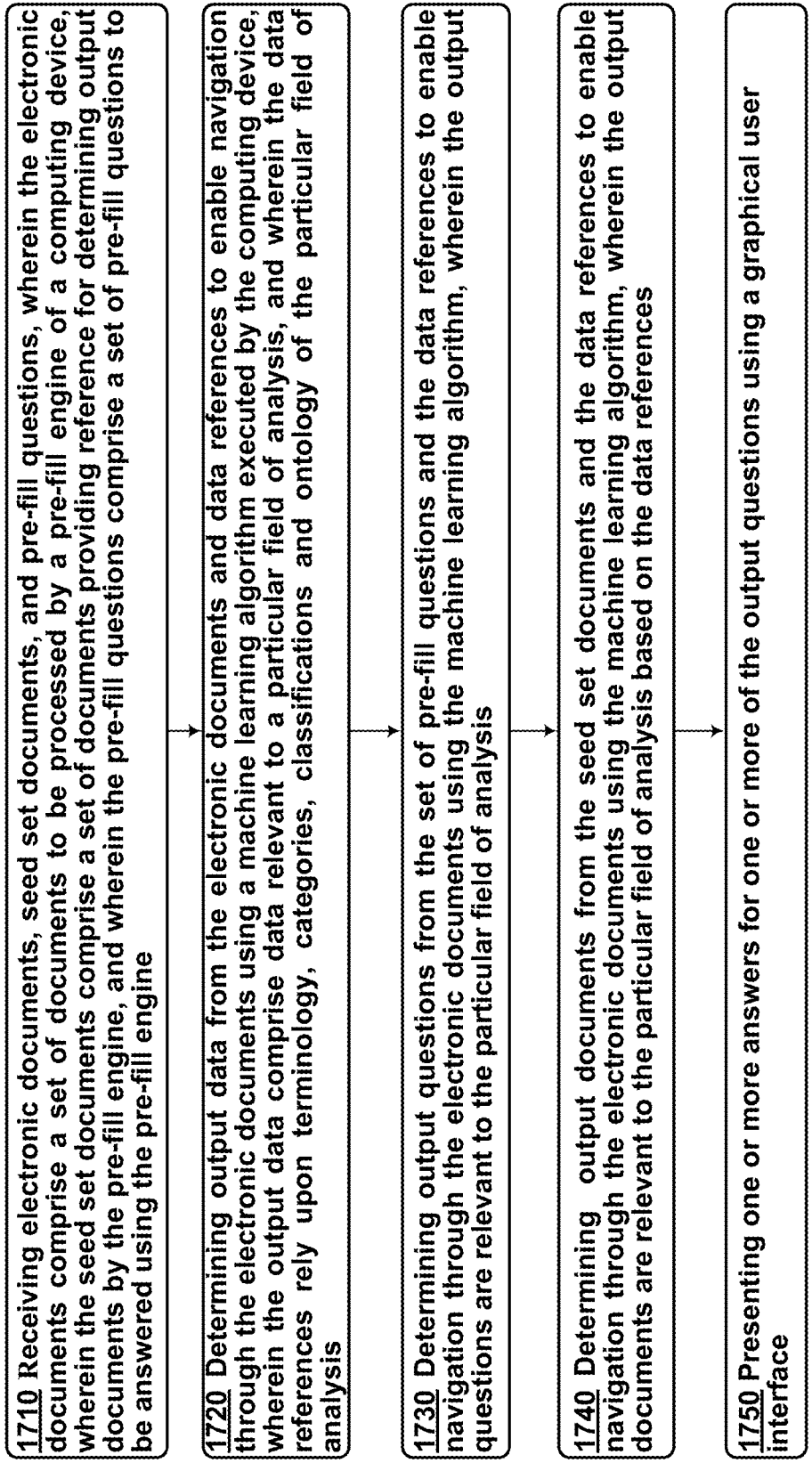
FIG. 17 shows a flowchart for a method, according to an example embodiment.

FIG. 17 is a flowchart of method 1700, in accordance with at least some example embodiments. Method 1700 can carried out by a computing device, such as computing device 100. Method 1700 can begin at block 1710, where the computing device can receive electronic documents, seed dataset documents, and pre-fill questions, where the electronic documents comprise a set of documents to be processed by the pre-fill engine, where the seed dataset documents comprise a set of documents providing reference for determining output documents by the pre-fill engine, and where the pre-fill questions comprise a set of pre-fill questions to be answered using the pre-fill engine, as discussed above herein in the context of at least FIG. 4.

In some examples, the method 1700 can further include receiving answers to one or more associated pre-fill questions of the set of pre-fill questions through the graphical user interface, as discussed above herein in the context of at least FIG. 12.

At block 1720, the method 1700 can include determining output data from the electronic documents and data references that enable navigation through the electronic documents using a machine learning algorithm executed by the computing device, where the output data comprise data relevant to a particular field of analysis, and where the data references rely upon terminology, categories, classification and ontology of the particular field of analysis, as discussed above herein in the context of at least FIG. 5-8.

At block 1730, the method 1700 can include determining output questions from the set of pre-fill questions and the data references that enable navigation through the electronic documents using the machine learning algorithm, where the output questions are relevant to the particular field of analysis, as discussed above herein in the context of at least FIG. 9.

In some examples, the method 1700 can further include generating additional output questions using the pre-fill engine, the pre-fill questions, and the data references, as discussed above herein in the context of at least FIG. 9.

At block 1740, the method 1500 can include determining output documents from the seed dataset documents and the data references to enable navigation through the electronic documents using the machine learning algorithm, where the output documents are relevant to the particular field of analysis according to the data references, as discussed above herein in the context of at least FIG. 9.

At block 1750, the method 1700 can include presenting one or more answers for one or more of the output questions using a graphical user interface, as discussed above herein in the context of at least FIG. 11-14.

In some examples, the method 1700 can include where at least part of the output data and at least one of the electronic documents are displayed side by side on one screen in the graphical user interface for verification, as discussed above herein in the context of at least FIG. 11.

In some examples, the method 1700 can include where the set of pre-fill questions are shown with corresponding answers on the graphical user interface, as discussed above herein in the context of at least FIGS. 12 and 13.

In some examples, the method 1700 can include where a score is displayed for an entity being evaluated and where the score is determined based on the output data and answers to the output questions, as discussed above herein in the context of at least FIG. 14.

In some examples, the method 1700 can further include a performance monitor and training the pre-fill engine by utilizing the performance monitor to provide user feedback to the machine learning algorithm, where the user feedback includes user verification of the output data, the output documents, and/or the one or more answers provided by the pre-fill engine, as discussed above herein in the context of at least FIG. 6-10.

In some examples, the method 1700 can further include a seed dataset generator, a first database, receiving documents at the seed dataset generator from the first database, and determining the output documents from the documents received from the first database, as discussed above herein in the context of at least FIGS. 4, 9 and 10. Additional in some examples, the method 1700 can further comprise where the first database includes data about one or more of: legal documents, invoices, quotes, contracts, reports, spread sheets, certificates, permits, forms, applications, guarantee, agreements, and/or architectural plans, as discussed above herein in the context of at least FIG. 6. In addition, in some examples, the method 1700 can further comprise where the pre-fill engine searches one or more remote sources other than the first database as discussed above herein in the context of at least FIG. 9. Furthermore, in some examples, the method 1700 can further comprise where the pre-fill questions are obtained from the first database as discussed above herein in the context of at least FIG. 9.

Figure 18:
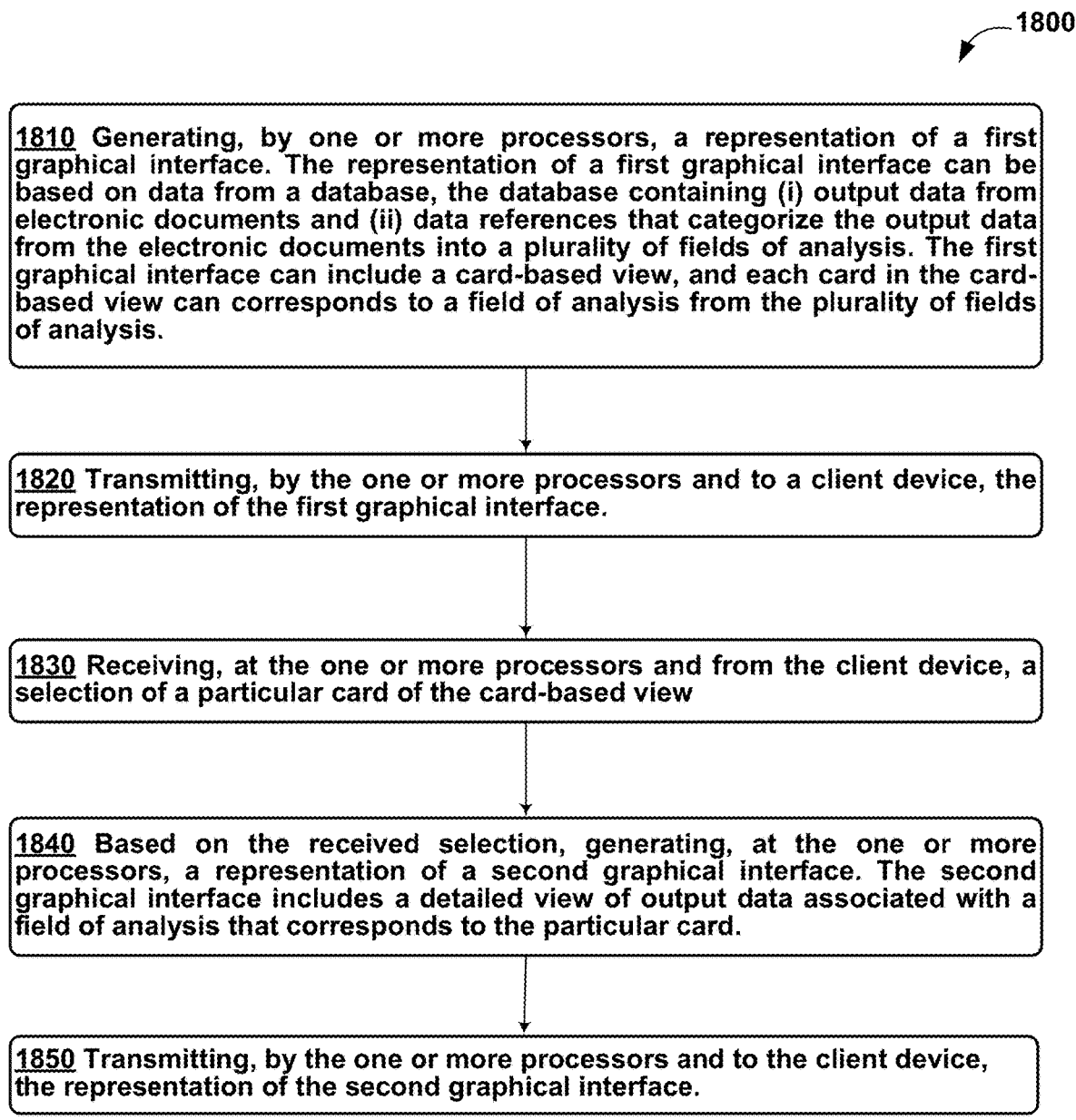
FIG. 18 shows a flowchart for a method, according to an example embodiment.

FIG. 18 is a flowchart of method 1800, in accordance with at least some example embodiments. Method 1800 can be carried out by a computing device, such as computing device 100.

Block 1810 includes generating, by one or more processors, a representation of a first graphical interface. The representation of a first graphical interface can be based on data from a database, the database containing (i) output data from electronic documents and (ii) data references that categorize the output data from the electronic documents into a plurality of fields of analysis. The first graphical interface can include a card-based view, and each card in the card-based view can correspond to a field of analysis from the plurality of fields of analysis.

Block 1820 includes transmitting, by the one or more processors and to a client device, the representation of the first graphical interface.

Block 1830 includes receiving, at the one or more processors and from the client device, a selection of a particular card of the card-based view.

Block 1840 includes, based on the received selection, generating, at the one or more processors, a representation of a second graphical interface. The second graphical interface includes a detailed view of output data associated with a field of analysis that corresponds to the particular card.

Block 1850 includes transmitting, by the one or more processors and to the client device, the representation of the second graphical interface.

Some embodiments include, receiving, from the client device, an exit signal via the second graphical interface, and transmitting, to the client device, the representation of the first graphical interface.

In some embodiments, the electronic documents include legal documents, invoices, quotes, contracts, reports, spread sheets, certificates, permits, forms, applications, guarantee, agreements, and/or architectural plans.

Some embodiments include generating, by a document analyzer module, the output data from electronic documents by extracting each word in the electronic documents using a domain semantic dictionary.

In some embodiments, the document analyzer generates data references that categorize the output data by applying a document categorizer to each extracted word from the electronic documents.

In some embodiments, the document categorizer relies upon terminology, categories, classifications and ontology of the plurality of fields of analysis.

In some embodiments, the detailed view of the output data includes a table-based view of the output data.

In some embodiments, the detailed view of the output data includes a map-based view of the output data, where the map-based view comprises data queried from a third party data source.

In some embodiments, wherein the detailed view of the output data includes one or more pre-filled questions and answers.

While some embodiments have been illustrated and described in detail in the appended drawings and the foregoing description, such illustration and description are to be considered illustrative and not restrictive. Other variations to the disclosed embodiments can be understood and effected in practicing the claims, from a study of the drawings, the disclosure, and the appended claims. The mere fact that certain measures or features are recited in mutually different dependent claims does not indicate that a combination of these measures or features cannot be used. Any reference signs in the claims should not be construed as limiting the scope.

The invention claimed is:

1. A system comprising:
one or more processors executing machine-readable instructions to perform operations that include:
generating, using a machine learning algorithm trained using seed dataset documents, output data from an electronic document including by extracting each word in the electronic document and referencing a domain semantic dictionary storing insurance-specific words;
generating data references that categorize the output data from the electronic document into a plurality of fields of analysis related to insurance underwriting, wherein the categorizing includes referencing at least one of terminology, categories, classifications, and ontology of the plurality of fields of analysis related to insurance underwriting;
generating, from the output data and the data references, a representation of a first graphical interface that includes a plurality of interface elements grouped and arranged according to a respective field of analysis from the plurality of fields of analysis related to insurance underwriting, wherein each interface element is a graphical representation of an information category;
transmitting, to a client device, the representation of the first graphical interface;
receiving, from the client device, a selection of a particular interface element from among the plurality of interface elements in the first graphical interface;
based on the received selection, generating a representation of a second graphic al interface, wherein the second graphical interface includes a detailed view of output data associated with a field of analysis that corresponds to the particular interface element in the received selection; and
transmitting, to the client device, the representation of the second graphical interface.

2. The system of claim 1, wherein the operations further comprise:
receiving, from the client device, an exit signal via the second graphical interface, and transmitting, to the client device, the representation of the first graphical interface.

3. The system of claim 1, wherein the electronic documents include legal documents, invoices, quotes, contracts, reports, spread sheets, certificates, permits, forms, applications, guarantee, agreements, and/or architectural plans.

4. The system of claim 1, wherein, to categorize the output data, the one or more processors rely upon the at least one of the terminology, categories, classifications and ontology of the plurality of fields of analysis related to insurance underwriting.

5. The system of claim 1, wherein the detailed view of the output data includes a table-based view of the output data.

6. The system of claim 1, wherein the detailed view of the output data includes a map-based view of the output data, and wherein the map-based view comprises data queried from a third party data source.

7. The system of claim 1, wherein the detailed view of the output data includes one or more pre-filled questions and corresponding answers relevant to the field of analysis that corresponds to the particular interface element in the received selection, and wherein at least the one or more pre-filled questions are determined by a computer-implemented pre-fill engine from a set of pre-fill questions stored in a pre-fill question repository.

8. A computer-implemented method comprising:
generating, by one or more processors using a machine learning algorithm trained using seed dataset documents, output data from an electronic document including by extracting each word in the electronic document and referencing a domain semantic dictionary storing insurance-specific words;

generating, by the one or more processors, data references that categorize the output data from the electronic document into a plurality of fields of analysis related to insurance underwriting, wherein the categorizing includes referencing at least one of terminology, categories, classifications, and ontology of the plurality of fields of analysis related to insurance underwriting;

generating, by the one or more processors, from the output data and the data references, a representation of a first graphical interface, wherein the first graphical interface includes a plurality of interface elements grouped and arranged according to a respective field of analysis from the plurality of fields of analysis related to insurance underwriting, and wherein each interface element is a graphical representation of an information category;

transmitting, by the one or more processors and to a client device, the representation of the first graphical interface;

receiving, at the one or more processors and from the client device, a selection of a particular interface element from among the plurality of interface elements in the first graphical interface;

based on the received selection, generating, at the one or more processors, a representation of a second graphical interface, wherein the second graphical interface includes a detailed view of output data associated with a field of analysis that corresponds to the particular interface element in the received selection; and transmitting, by the one or more processors and to the client device, the representation of the second graphical interface.

9. The method of claim 8, further comprising:

receiving, at the one or more processors and from the client device, an exit signal via the second graphical interface, and transmitting, by the one or more processors and to the client device, the representation of the first graphical interface.

10. The method of claim 8, wherein the electronic documents include legal documents, invoices, quotes, contracts, reports, spread sheets, certificates, permits, forms, applications, guarantee, agreements, and/or architectural plans.

11. The method of claim 8, wherein, to categorize the output data, the one or more processors rely upon the at least one of the terminology, categories, classifications and ontology of the plurality of fields of analysis related to insurance underwriting.

12. The method of claim 8, wherein the detailed view of the output data includes a table-based view of the output data.

13. The method of claim 8, wherein the detailed view of the output data includes a map-based view of the output data, and wherein the map-based view comprises data queried from a third party data source.

14. The method of claim 8, wherein the detailed view of the output data includes one or more pre-filled questions and corresponding answers relevant to the field of analysis that corresponds to the particular interface element in the received selection, and wherein at least the one or more pre-filled questions are determined by a computer-implemented pre-fill engine from a set of pre-fill questions stored in a pre-fill question repository.

15. A non-transitory computer-readable medium storing a set of instructions that, when executed by one or more processors of a computing device, cause the computing device to perform functions comprising:

generating, using a machine learning algorithm trained using seed dataset documents, output data from an electronic document including by extracting each word in the electronic document and referencing a domain semantic dictionary storing insurance-specific words;

generating data references that categorize the output data from the electronic document into a plurality of fields of analysis related to insurance underwriting, wherein the categorizing includes referencing at least one of terminology, categories, classifications, and ontology of the plurality of fields of analysis related to insurance underwriting;

generating, from the output data and the data references, a representation of a first graphical interface that includes a plurality of interface elements grouped and arranged according to a respective field of analysis from the plurality of fields of analysis related to insurance underwriting, wherein each interface element is a graphical representation of an information category;

transmitting, by the one or more processors and to a client device, the representation of the first graphical interface;

receiving, at the one or more processors and from the client device, a selection of a particular interface element from among the plurality of interface elements in the first graphical interface;

based on the received selection, generating, at the one or more processors, a representation of a second graphical interface, wherein the second graphical interface includes a detailed view of output data associated with a field of analysis that corresponds to the particular interface element in the received selection; and transmitting, by the one or more processors and to the client device, the representation of the second graphical interface.

16. The non-transitory computer-readable medium of claim 15, wherein the functions further comprise:

receiving, at the one or more processors and from the client device, an exit signal via the second graphical interface, and transmitting, by the one or more processors and to the client device, the representation of the first graphical interface.

* * * * *